US011914058B2

(12) United States Patent
Edge et al.

(10) Patent No.: US 11,914,058 B2
(45) Date of Patent: *Feb. 27, 2024

(54) SYSTEMS AND METHODS FOR STORAGE OF UE POSITIONING CAPABILITIES IN A NETWORK

(71) Applicant: QUALCOMM Incorporated, San Diego, CA (US)

(72) Inventors: Stephen William Edge, Escondido, CA (US); Sven Fischer, Nuremberg (DE); Alexandros Manolakos, Escondido, CA (US); Sony Akkarakaran, Poway, CA (US); Guttorm Ringstad Opshaug, Redwood City, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,288

(22) Filed: Apr. 11, 2022

(65) Prior Publication Data

US 2022/0317231 A1 Oct. 6, 2022

Related U.S. Application Data

(63) Continuation of application No. 17/710,792, filed on Mar. 31, 2022, now Pat. No. 11,630,181.

(Continued)

(51) Int. Cl.
*H04W 8/22* (2009.01)
*G01S 5/00* (2006.01)
(Continued)

(52) U.S. Cl.
CPC .......... *G01S 5/0036* (2013.01); *H04W 4/029* (2018.02); *H04W 4/12* (2013.01); *H04W 8/02* (2013.01);
(Continued)

(58) Field of Classification Search
CPC .......... G01S 5/00; G01S 19/09; G01S 5/0036; G01S 819/09; H04W 4/029; H04W 4/12;
(Continued)

(56) References Cited

U.S. PATENT DOCUMENTS 11,009,582 B2   5/2021   Hu et al.
11,125,849 B2   9/2021   Shi et al.
(Continued)

FOREIGN PATENT DOCUMENTS

CN   113709787   11/2021
EP   2600654     6/2013
(Continued)

OTHER PUBLICATIONS

Positioning Method and Apparatus; WO 2021217629 A1; Hao, Jinping (Year: 2021).*

(Continued)

*Primary Examiner* — Meless N Zewdu
(74) *Attorney, Agent, or Firm* — QUALCOMM Incorporated

(57) ABSTRACT

The positioning capabilities of a User Equipment (UE) are stored in a core network to reduce positioning latency when the UE indicates that its positioning capabilities are stable and/or are long term valid. The UE may provide its positioning capabilities to a location server during a location session along with an indication of whether the positioning capabilities are stable. The location server may enable storage of the positioning capabilities for the UE in the core network, e.g., in the location server or another entity in the core network such as Access and Mobility Management Function (AMF), if there is an indication that the positioning capabilities are stable. The AMF may include a UE identifier in location requests with which the location server may retrieve the UE positioning capabilities if stored at the (Continued)

location server or may include the UE positioning capabilities if stored at the AMF.

44 Claims, 10 Drawing Sheets

Related U.S. Application Data

(60) Provisional application No. 63/171,072, filed on Apr. 5, 2021.

(51) Int. Cl.
*H04W 64/00* (2009.01)
*H04W 4/12* (2009.01)
*H04W 4/029* (2018.01)
*H04W 8/02* (2009.01)

(52) U.S. Cl.
CPC .............. *H04W 8/22* (2013.01); *H04W 64/00* (2013.01); *H04W 64/006* (2013.01)

(58) Field of Classification Search
CPC ..... H04W 64/00; H04W 64/006; H04W 8/02; H04W 12/104; H04W 88/00; H04W 88/02; H04W 88/08; H04W 88/14; H04W 4/02; H04W 4/021; H04W 12/69; H04W 88/023; H04W 4/023; H04W 84/005; H04W 28/0831; H04W 28/0842; H04W 40/20; H04W 4/025; H04W 8/08; H04W 8/00; H04W 8/04; H04W 8/22; H04W 8/20; H04W 56/006; H04W 4/027; H04W 64/003; Y02D 30/70
See application file for complete search history.

(56) References Cited

U.S. PATENT DOCUMENTS

| | | | |
|---|---|---|---|
| 11,191,054 B2 | 11/2021 | Opshaug et al. | |
| 11,630,181 B2* | 4/2023 | Edge et al. | G01S 5/0036 |
| 2008/0281520 A1* | 11/2008 | Ogawa et al. | H04W 701/213 |
| 2011/0201352 A1* | 8/2011 | Mallick et al. | 455/456.1 |
| 2012/0136623 A1 | 5/2012 | Edge et al. | |
| 2013/0079039 A1 | 3/2013 | Heikkilae et al. | |
| 2014/0235264 A1* | 8/2014 | Venkatraman et al. | H04W 4/02 |
| 2018/0199160 A1* | 7/2018 | Edge et al. | H04W 4/029 |
| 2018/0324740 A1* | 11/2018 | Edge et al. | H04W 64/00 |
| 2020/0084569 A1* | 3/2020 | Jain et al. | H04W 4/02 |
| 2020/0106632 A1* | 4/2020 | Lewis et al. | H04L 12/282 |
| 2020/0314595 A1 | 10/2020 | Hayes et al. | |
| 2021/0067990 A1 | 3/2021 | Opshaug et al. | |
| 2021/0109188 A1* | 4/2021 | Kumar et al. | G01S 5/0221 |
| 2021/0274458 A1* | 9/2021 | Edge et al. | H04W 64/00 |
| 2022/0322044 A1 | 10/2022 | Edge et al. | |

FOREIGN PATENT DOCUMENTS

| | | | |
|---|---|---|---|
| EP | 2835993 A1 | 2/2015 | |
| EP | 3833066 | 6/2021 | |
| TW | 202127928 | 7/2021 | |
| WO | WO 2020024972 | 2/2020 | |
| WO | WO-2020167615 A1 | 8/2020 | |
| WO | 2021252377 A1 | 12/2021 | |
| WO | WO 2022141431 A1 * | 7/2022 | G01S 5/02 |

OTHER PUBLICATIONS

Systems and Methods for Positioning With Channel Measurements; WO 2020171928 A1; Ferrari Lorenzo et al. (Year: 2020).*
Method And Device For Reporting Terminal Positioning Capability; CN 114765773 A; Zhang et al. (Year: 2022).*
Positioning Method, Device, Equipment, and Storage Medium; WO 2; 022110176 A1; Dong, Xiandong (Year: 2022).*
WO 2022152087 A1), Fu et al.: Method For Reporting Terminal Positioning Capability, Involves Setting Positioning Method For Target Terminal According To Positioning Capability Of Terminal By Location Management Function (LMF) Entity (see title). (Year: 2022).*
(CN 114765773 A), Zhang et al.: Method And Device For Reporting Terminal Positioning Capability (see title). (Year: 2022).*
International Search Report and Written Opinion—PCT/US2022/023090—ISA/EPO—dated Jul. 15, 2022.
CATT: "Further Discussion on Enhancements for Commercial use Cases", 3GPP Draft, 3GPP TSG-RAN WG2 #112-e, R2-2008810, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2020, Oct. 23, 2020 (Oct. 23, 2020), XP051941909, 5 Pages, 2. Discussion 2.3 Enhancement on latency figure 6.1.2-1 3. Conclusion.
Huawei, et al., "[Offline-622] [POS] Summary on Uplink Capability for Positioning", 3GPP Draft, 3GPP TSG-RAN WG2 Meeting #109-e, R2-2001947, 3rd Generation Partnership Project (3GPP), Mobile Competence Centre, 650, Route Des Lucioles, F-06921 Sophia-Antipolis Cedex, France, vol. RAN WG2, No. Online, Feb. 24, 2020-Mar. 6, 2020, Mar. 11, 2020 (Mar. 11, 2020), XP051864583, 5 Pages, 2.2 Discussion#3: What UL capability is needed at LMF.
Nokia Siemens Networks, et al., "Considerations for Some LPP Stage 2 Outstanding Issues", 3GPP Draft, 3GPP TSG-RAN WG2 Meeting #67bis, R2-095985, 3rd Generation Partnership Project (3GPP), Mobile Competence Centre, 650, Route Des Lucioles, F-06921 Sophia-Antipolis Cedex, France, No. Miyazaki, Oct. 12, 2009, Oct. 12, 2009 (Oct. 12, 2009), XP050390409, 3 Pages, 2.1 Transport of UE positioning capability 2.4 Network support indicator for LPP.
QUALCOMM Incorporated: "Discussion of Storing UE Positioning Capabilities in 5GC", SA WG2 Meeting #144e, S2-2102420, 3rd Generation Partnership Project, Mobile Competence Centre, 650, Route Des Lucioles, F-06921 Sophia-Antipolis Cedex, France, vol. SA WG2, No. e-Meeting, Apr. 12, 2021-Apr. 16, 2021, Apr. 6, 2021, XP051993796, 6 Pages, 2. Variation of Positioning Capabilities 3 Solutions for Storage of UE Positioning Capabilities figure 1 figure 2 figure 3 4. Evaluation of Solutions 5. Proposal.
QUALCOMM Incorporated: "LPP Impacts for UE Positioning Capability Storage", 3GPP Draft, 3GPP TSG-RAN WG2 Meeting #115-e, R2-2108377, 3rd Generation Partnership Project (3GPP), Mobile Competence Centre, 650, Route Des Lucioles, F-06921 Sophia-Antipolis Cedex, France, vol. RAN WG2, No. Electronic Meeting, Aug. 16, 2021-Aug. 27, 2021, Aug. 6, 2021, XP052034778, 6 Pages, Sections 1 and 2.

* cited by examiner

SYSTEMS AND METHODS FOR STORAGE OF UE POSITIONING CAPABILITIES IN A NETWORK

CROSS-REFERENCE TO RELATED APPLICATIONS

This application is a continuation of U.S. application Ser. No. 17/710,792, entitled "SYSTEMS AND METHODS FOR STORAGE OF UE POSITIONING CAPABILITIES IN A NETWORK," filed Mar. 31, 2022, which claims the benefit of and priority to U.S. Provisional Application No. 63/171,072, entitled "STORAGE OF UE POSITIONING CAPABILITIES IN A NETWORK," filed Apr. 5, 2021, both of which are assigned to the assignee hereof and are expressly incorporated herein by reference in their entireties.

BACKGROUND OF THE DISCLOSURE

Field of the Disclosure

The present disclosure relates generally to communication, and more specifically to techniques for supporting location services for user equipments (UEs).

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) New Radio (NR) standard calls for higher data transfer speeds, greater numbers of connections, and better coverage, among other improvements. 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication system. For example, this may enable tracking of the mobile device for such applications as navigation assistance, public safety support or management of moving objects in a factory or warehouse. This may also assist one off location of a wireless caller for an emergency services call and one off or multiple location provision of people, vehicles and other objects. Power efficiency and latency reduction during such positioning services may typically be desirable.

SUMMARY

The positioning capabilities of a User Equipment (UE) are stored in a core network to reduce positioning latency when the UE indicates that its positioning capabilities are stable and/or are long term valid. The UE may provide its positioning capabilities to a location server during a location session along with an indication of whether the positioning capabilities are stable. The location server may enable storage of the positioning capabilities for the UE in the core network, e.g., in the location server or another entity in the core network such as Access and Mobility Management Function (AMF), if there is an indication that the positioning capabilities are stable. The AMF may include a UE identifier in location requests with which the location server may retrieve the UE positioning capabilities if stored at the location server or may include the UE positioning capabilities if stored at the AMF.

In one implementation, a method performed by a User Equipment (UE) for supporting positioning of the UE in a wireless network, includes receiving a request for positioning capabilities message from a location server in a core network for the wireless network; and sending a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

In one implementation, a User Equipment (UE) configured for supporting positioning of the UE in a wireless network, includes a wireless transceiver configured to wirelessly communicate with entities in the wireless network; at least one memory; at least one processor coupled to the wireless transceiver and the at least one memory, wherein the at least one processor is configured to: receive, via the wireless transceiver, a request for positioning capabilities message from a location server in a core network for the wireless network; and send, via the wireless transceiver, a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

In one implementation, a User Equipment (UE) configured for supporting positioning of the UE in a wireless network, includes means for receiving a request for positioning capabilities message from a location server in a core network for the wireless network; and means for sending a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

In one implementation, a non-transitory storage medium including program code stored thereon, the program code is operable to configure at least one processor in a User Equipment (UE) for supporting positioning of the UE in a wireless network, the program code comprising instructions to: receive a request for positioning capabilities message from a location server in a core network for the wireless network; and send a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

In one implementation, a method performed by a location server in a core network for a wireless network for supporting positioning of a User Equipment (UE) in the wireless network, includes receiving positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and enabling storage of the positioning capabilities for the UE in the core network if the indication indicates that the positioning capabilities are stable.

In one implementation, a location server in a core network for a wireless network configured for supporting positioning of a User Equipment (UE) in the wireless network, includes an external interface configured to wirelessly communicate with entities in the wireless network; at least one memory; at least one processor coupled to the external interface and the at least one memory, wherein the at least one processor is configured to: receive, via the external interface, positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and enable storage of the positioning capabilities for the UE in the core network if the indication indicates that the positioning capabilities are stable.

In one implementation, a location server in a core network for a wireless network configured for supporting positioning of a User Equipment (UE) in the wireless network, includes means for receiving positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and means for enabling storage of the positioning capabilities for the UE in the core network if the indication indicates that the positioning capabilities are stable.

In one implementation, a non-transitory storage medium including program code stored thereon, the program code is operable to configure at least one processor in a location server in a core network for a wireless network for supporting positioning of a User Equipment (UE) in the wireless network, the program code comprising instructions to: receive positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and enable storage of the positioning capabilities for the UE in the core network if the indication indicates that the positioning capabilities are stable.

In one implementation, a method performed by a first entity in a core network for a wireless network for supporting positioning of a User Equipment (UE) in the wireless network, includes storing positioning capabilities for the UE when the UE indicates that the positioning capabilities are stable; and sending a location request to a location server wherein the location request includes the stored positioning capabilities for the UE.

In one implementation, a first entity in a core network for a wireless network configured for supporting positioning of a User Equipment (UE) in the wireless network, includes an external interface configured to wirelessly communicate with entities in the wireless network; at least one memory; at least one processor coupled to the external interface and the at least one memory, wherein the at least one processor is configured to: store positioning capabilities for the UE when the UE indicates that the positioning capabilities are stable; and send, via the external interface, a location request to a location server wherein the location request includes the stored positioning capabilities for the UE.

In one implementation, a first entity in a core network for a wireless network configured for supporting positioning of a User Equipment (UE) in the wireless network, includes means for storing positioning capabilities for the UE when the UE indicates that the positioning capabilities are stable; and means for sending a location request to a location server wherein the location request includes the stored positioning capabilities for the UE.

In one implementation, a non-transitory storage medium including program code stored thereon, the program code is operable to configure at least one processor in a first entity in a core network for a wireless network for supporting positioning of a User Equipment (UE) in the wireless network, the program code comprising instructions to: store positioning capabilities for the UE when the UE indicates that the positioning capabilities are stable; and send a location request to a location server wherein the location request includes the stored positioning capabilities for the UE.

In one implementation, a method performed by a first entity in a core network for a wireless network for supporting positioning of a User Equipment (UE) in the wireless network, includes receiving a location request for the UE; sending a location request message to a location server, wherein the location request message comprises an identification for the UE, wherein positioning capabilities for the UE and the identification for the UE are stored by the location server when there is an indication from the UE that the positioning capabilities for the UE are stable.

In one implementation, a first entity in a core network for a wireless network configured for supporting positioning of a User Equipment (UE) in the wireless network, includes an external interface configured to wirelessly communicate with entities in the wireless network; at least one memory; at least one processor coupled to the external interface and the at least one memory, wherein the at least one processor is configured to: receive, via the external interface, a location request for the UE; send, via the external interface, a location request message to a location server, wherein the location request message comprises an identification for the UE, wherein positioning capabilities for the UE and the identification for the UE are stored by the location server when there is an indication from the UE that the positioning capabilities for the UE are stable.

In one implementation, a first entity in a core network for a wireless network configured for supporting positioning of a User Equipment (UE) in the wireless network, includes means for receiving a location request for the UE; means for sending a location request message to a location server, wherein the location request message comprises an identification for the UE, wherein positioning capabilities for the UE and the identification for the UE are stored by the location server when there is an indication from the UE that the positioning capabilities for the UE are stable.

In one implementation, a non-transitory storage medium including program code stored thereon, the program code is operable to configure at least one processor in a first entity in a core network for a wireless network for supporting positioning of a User Equipment (UE) in the wireless network, the program code comprising instructions to: receive a location request for the UE; send a location request message to a location server, wherein the location request message comprises an identification for the UE, wherein positioning capabilities for the UE and the identification for the UE are stored by the location server when there is an indication from the UE that the positioning capabilities for the UE are stable.

BRIEF DESCRIPTION OF THE DRAWINGS

The accompanying drawings are presented to aid in the description of various aspects of the disclosure and are provided solely for illustration of the aspects and not limitation thereof.

Figure 1:
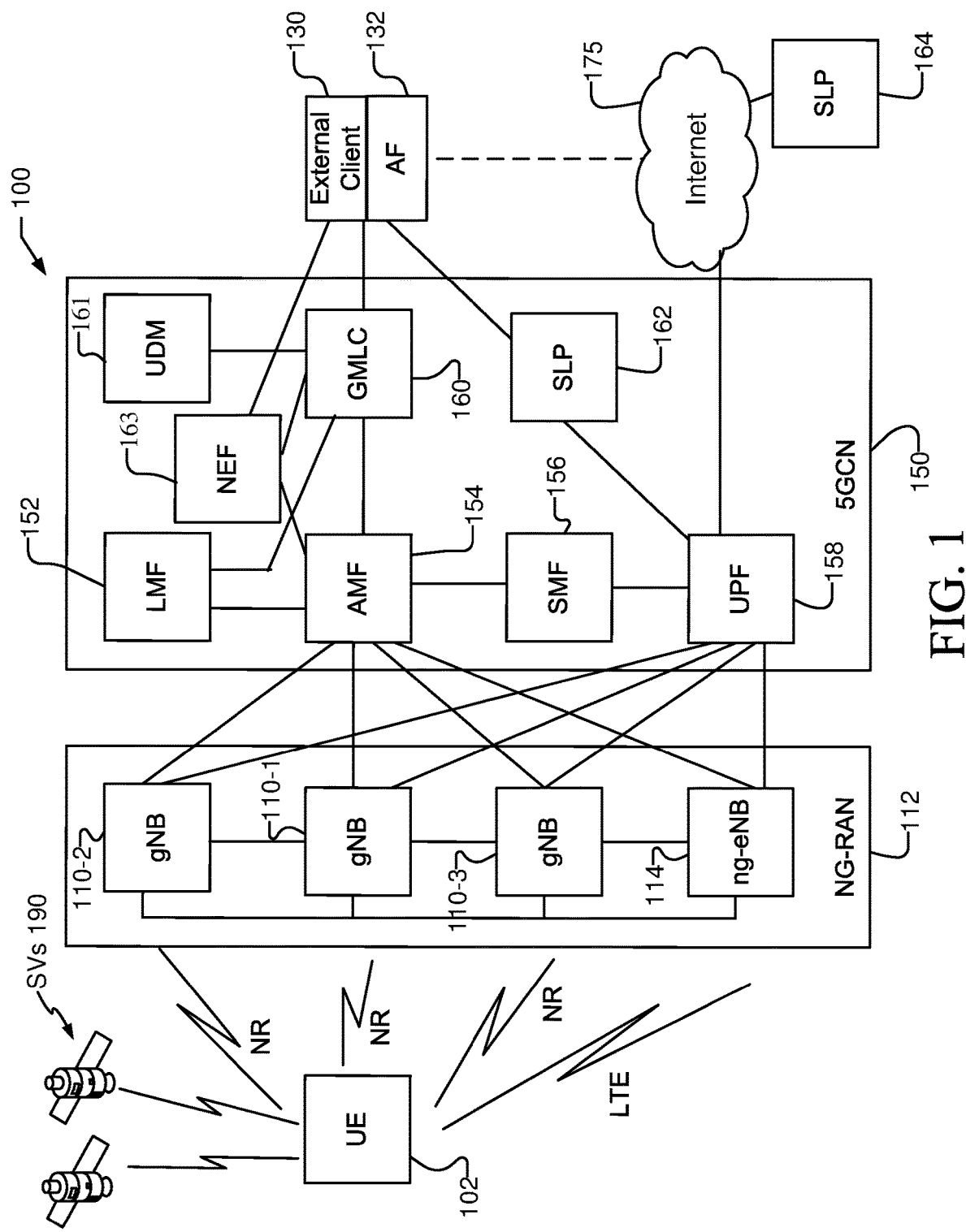
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a CP location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE, e.g. for Assisted GNSS (A-GNSS), UL-TDOA, DL-TDOA, AoD, AoA, Multi-cell RTT (also referred to as Multi RTT), and/or Enhanced Cell ID (ECID) position methods. Assistance data may be used by a UE to acquire and measure GNSS signals and/or Positioning Reference Signals (PRSs), e.g. by providing expected characteristics of these signals to the UE such as frequency, expected time of arrival, signal coding, signal Doppler.

In a UE based mode of operation, assistance data may also or instead be used by a UE to help determine a location estimate from the resulting location measurements (e.g., if the assistance data provides satellite ephemeris data in the case of A-GNSS positioning or base station locations and other base station characteristics such as PRS timing in the case of terrestrial positioning using, e.g., DL-TDOA, DL-AoD, Multi-RTT, etc.).

In a UE assisted mode of operation, a UE may return location measurements to a location server which may then determine an estimated location of the UE based on these measurements and possibly based also on other known or configured data (e.g. satellite ephemeris data for A-GNSS location or base station characteristics including base station locations and possibly PRS timing in the case of terrestrial positioning using, e.g., DL-TDOA, DL-AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP)

defined by 3GPP in 3GPP Technical Specification (TS) 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB (eNB) for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB (eNB) for LTE access or an NR NodeB (gNodeB or gNB) for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and a location server that is an E-SMLC. In the case of NR access, the New Radio Position Protocol A (NRPPa) protocol defined in 3GPP TS 38.455 may be used to transfer such messages between a base station that is a gNodeB and a location server that is an LMF.

During a location session, the location server typically obtains the positioning capabilities from the UE, e.g., in response to a request for positioning capabilities sent to the UE by the location server. The positioning capabilities of the UE are used to determine the type of positioning procedure and positioning measurement(s) to use during the location session, and to generate and provide any necessary assistance data to the UE accordingly. Obtaining the positioning capabilities of the UE via signaling to and from the UE increases latency in the location session and may also slightly increase UE power expenditure. The positioning latency (and UE power expenditure) would be reduced if the positioning capabilities of the UE could be obtained prior to initiating the location session, e.g., by storing positioning capabilities in a core network before the positioning request is received by the core network. For example, by storing positioning capabilities in the core network, positioning latency could be reduced by around 50 to 100 milliseconds (ms). For user cases where an external Location Service (LCS) Client is a person and not a machine or a server, latency requirements may be in the order of seconds, for which a latency reduction of 50 to 100 ms would be negligible. However, a latency reduction of, e.g., 50 to 100 ms may be advantageous for user cases with low latency requirements (e.g. less than one second), which may be associated with Industrial Internet of Things (IIoT) UEs or where the external LCS Client is a machine or server and not a person. Storing positioning capabilities of a UE in the core network may require additional overhead for entities in the core network and the UE, which may not be justified for all user cases, but may be advantageous in some user cases. The positioning capabilities of a UE, however, may not always be static but may instead vary depending on the UE implementation, UE state and configuration by a user. A consequence of varying positioning capabilities is that any positioning capabilities previously stored by the core network could be in error at a later time.

As discussed herein, the positioning capabilities of a UE may be stored in the core network in a manner that reduces or eliminates errors caused by changes in the positioning capabilities. For example, the positioning capabilities of a UE may be stored in the core network in response to an indication that the positioning capabilities for the UE are stable and/or long-term valid, e.g., the positioning capabilities for the UE are fixed and will not change over time. The UE, in one implementation, may provide its positioning capabilities to a location server during a location session and may include an indication of whether the positioning capabilities are stable and/or are not subject to variation. The location server may enable storage of the positioning capabilities for the UE in the core network if the positioning capabilities are indicated as stable (or as not subject to variation). In some implementations, the location server may store the positioning capabilities for the UE. The positioning capabilities for the UE, for example, may be associated with a UE identification and stored at the location server. A second entity in the core network, e.g., an AMF, may provide the UE identification to the location server in a location request for subsequent location sessions, which the location server may use to retrieve the positioning capabilities for the UE. In some implementations, the location server may send the positioning capabilities for the UE to a second entity (e.g. an AMF) in the core network for storage. For example, the location server may include the positioning capabilities for the UE in a location response message to the second entity during a first location session for storage, and the second entity may later retrieve and include the positioning capabilities for the UE in a location request to the location server in subsequent location sessions. In another implementation, the UE may provide its positioning capabilities to an entity in the core network (e.g. an AMF) prior to entering a location session, e.g., during Registration of the UE, and the entity may store the positioning capabilities for the UE based on an indication of stability (or non-variability). The UE, for example, may include an explicit indication that its positioning capabilities are stable (or non-variable), or the transmission of the positioning capabilities by the UE may be an implicit indication that the positioning capabilities are stable (or non-variable). In subsequent location sessions, the entity may retrieve and include the positioning capabilities for the UE in a location request to a location server.

FIG. 1 shows an architecture based on a non-roaming 5G network to support UE positioning by storing the positioning capabilities for the UE in a core network as discussed herein. FIG. 1 illustrates a communication system 100 that comprises a UE 102, which is sometimes referred to herein as a "target UE", since UE 102 may be the target of a location request. FIG. 1 also shows components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and a next generation eNB (ng-eNB) 114, and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 shows a serving gNB 110-1 for the UE 102 and neighbor gNBs 110-2, 110-3, and ng-eNB 114. A neighbor gNB may be any gNB which is able to receive and measure uplink (UL) signals transmitted by the UE 102 and/or is able to transmit a downlink (DL) reference signal (RS), e.g., positioning reference signals (PRS), that can be received and measured by the UE 102.

Entities in the NG-RAN 112 which transmit DL reference signals (RSs) to be measured by a UE 102 for a particular location session are referred to generically as "Transmission Points" (TPs) and can include one or more of the serving gNB 110-1, and neighbor gNBs 110-2, 110-3, and ng-eNB 114.

Entities in the NG-RAN 112 which receive and measure UL signals (e.g. an RS) transmitted by a UE 102 for a particular location session are referred to generically as "Reception Points" (RPs) and can include one or more of the serving gNB 110-1, and neighbor gNBs 110-2, 110-3, and ng-eNB 114.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110-1, 110-2, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 102 may communicate with a WiFi Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The UE 102 may be any electronic device and may be referred to as a device, a mobile device, a wireless device, a mobile terminal, a terminal, a mobile station (MS), a Secure User Plane Location (SUPL) Enabled Terminal (SET), or by some other name. The UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (e.g. via UPF 158 in 5GCN 150, or possibly via a Gateway Mobile Location Center (GMLC) 160, and/or allow the external client 130 to receive location information regarding the UE 102 (e.g., via the GMLC 160).

The UE 102 may enter a connected state with a wireless communication network that may include the NG-RAN 112. In one example, the UE 102 may communicate with a cellular communication network by transmitting wireless signals to, or receiving wireless signals from, a cellular transceiver in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from SVs 190 and/or may include measurements of signals received from terrestrial transmitters fixed at known locations (e.g., such as gNBs 110). UE 102 or LMF 152 to which UE 102 may send the measurements, may then obtain a location estimate for the UE 102 based on these location related measurements using any one of several position methods such as, for example, GNSS, Assisted GNSS (A-GNSS), Angle of Departure (AoD), Downlink Time Difference Of Arrival (DL-TDOA), Round-Trip Time (RTT), Multi RTT, WLAN (also referred to as WiFi) positioning, or Enhanced Cell ID (ECID) or combinations thereof. In some of these techniques (e.g. A-GNSS, RTT, Multi RTT, and DL-TDOA), pseudoranges or timing differences may be measured at UE 102 relative to three or more terrestrial transmitters (e.g. gNBs) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

A location server in FIG. 1 may correspond to, e.g., Location Management Function (LMF) 152 or Secure User Plane Location (SUPL) Location Platform (SLP) 162, and may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs) and/or signal, timing and orbital information for GNSS SVs to facilitate positioning techniques such as A-GNSS, AoD, DL-TDOA, RTT, Multi RTT and ECID. The facilitation may include improving signal acquisition and measurement accuracy by UE 102 and, in some cases, enabling UE 102 to compute its estimated location based on the location measurements. For example, a location server (e.g. LMF 152 or SLP 162) may include an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB 110 or WiFi AP) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AoA), an angle of departure (AoD), a receive time-transmission time difference (Rx-Tx), or a round trip signal propagation time (RTT) between UE 102 and a cellular transceiver (e.g. a gNB 110) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 152 or SLP 162) or broadcast by a base station (e.g. a gNB 110-1, 110-2) in NG-RAN 112 to determine a location for UE 102.

In some implementations, network entities are used to assist in location of a UE 102. For example, entities in a network such as gNBs 110-1, 110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 110-1, 110-2) may then transfer the location measurements to the UE 102 or LMF 152, which may use the measurements to determine a location estimate for UE 102. Examples of location measurements that may use UL signals can include an RSSI, RSRP, RSRQ, TOA, Rx-Tx, AoA and RTT.

An estimate of a location of the UE 102 may be referred to as a location, location estimate, location fix, fix, position, position estimate or position fix, and may be geodetic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geodetically or in civic form) within which the UE 102 is expected to be located with some probability or confidence level (e.g., 67%, 95%, etc.). A location of the UE 102 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 102 via wireless communication between the UE 102 and one or more of the gNBs 110, which may provide wireless communication access to the 5GCN 150 on behalf of the UE 102 using 5G (e.g. NR). In FIG. 1, the serving gNB for UE 102 is assumed to be gNB 110-1, although other gNBs (e.g. gNB 110-2, 110-3, or ng-eNB 114) may act as a serving gNB if UE 102 moves to another location or may act as a secondary gNB to provide additional throughout and bandwidth to UE 102. Some gNBs in FIG. 1 (e.g. gNB 110-2, 110-3, or ng-eNB 114) may be configured to function as positioning-only beacons which may transmit signals (e.g. directional PRS) to assist positioning of UE 102 but may not receive signals from UE 102 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by a core network. Thus, a RAN may include any combination of gNBs 110, evolved Node Bs (eNBs) supporting LTE, or other types of base stations or access points.

The gNBs 110-1, 110-2, 110-3, and ng-eNB 114 can communicate with the Access and Mobility Management Function (AMF) 154, which, for positioning functionality, may communicate with a Location Management Function (LMF) 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The GMLC 160 may support a location request for the UE 102 received from an external client 130 and may forward such a location request to a serving AMF 154 for UE 102. The AMF 154 may then forward the location request to LMF 152 which may obtain one or more location estimates for UE 102 (e.g. according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g. such as a current location or a sequence of periodic or triggered locations).

As illustrated, a Unified Data Management (UDM) 161 may be connected to the GMLC 160. The UDM 161 is analogous to a Home Subscriber Server (HSS) for LTE access, and if desired, the UDM 161 may be combined with an HSS. The UDM 161 is a central database that contains user-related and subscription-related information for UE 102 and may perform the following functions: UE authentication, UE identification, access authorization, registration and mobility management, subscription management and Short Message Service management.

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

To support services including location services from external clients 130 for Internet of Things (IoT) UEs, a Network Exposure Function (NEF) 163 may be included. The NEF 163, for example, may function to obtain a current or last known location for a UE 102, may obtain an indication of a change in location for a UE 102, or an indication of when a UE 102 becomes available (or reachable). An external client 130 (e.g. an external Client 130 that is an Application Function (AF) 132) may access NEF 163 in order to obtain location information for UE 102. The NEF 163 may be connected to the GMLC 160 to support last known location, current location and/or deferred periodic and triggered location for the UE 102. If desired, the NEF 163 may include, or may be combined with, the GMLC 160, and may then obtain location information for UE 102 from LMF 152 via AMF 154.

The LMF 152 and the gNB 110-1 may communicate using NRPPa, with NRPPa messages being transferred between the gNB 110-1 and the LMF 152 via the AMF 154. Further, the LMF 152 and UE 102 may communicate using the LTE Positioning Protocol (LPP) defined in 3GPP TS 37.355, where LPP (or LPP/LPPe) messages are transferred between the UE 102 and the LMF 152 via the serving AMF 154 and the serving gNB 110-1 for UE 102. For example, LPP messages may be transferred between the AMF 154 and the UE 102 using a 5G Non-Access Stratum (NAS) protocol. The LPP protocol may be used to support positioning of UE 102 using UE assisted and/or UE based position methods such as Assisted GNSS (A-GNSS), Real Time Kinematic (RTK), Wireless Local Area Network (WLAN), Angle of Departure (AoD), DL Time Difference of Arrival (DL-TDOA), Round-Trip Time (RTT), Multi RTT, and/or Enhanced Cell Identity (ECID). The NRPPa protocol may be used to support positioning of UE 102 using network based position methods such as UL-TDOA or ECID (when used with measurements obtained by or received from a gNB 110-1, 110-2, 110-3, or ng-eNB 114) and/or may be used by LMF 152 to obtain location related information from gNBs 110 such as parameters defining positioning reference signal (PRS) transmission from gNBs 110 for support of DL-TDOA, AoD, Multi RTT or other position methods.

GNBs 110-1, 110-2, 110-3, or ng-eNB 114 may communicate with AMF 154 using a Next Generation Application Protocol (NGAP), e.g. as defined in 3GPP Technical Specification (TS) 38.413. NGAP may enable AMF 154 to request a location of a UE 102 from a serving gNB 110-1 for target UE 102 and may enable gNB 110-1 to return a location for UE 102 to the AMF 154.

A gNB (e.g. gNB 110-1) may communicate with a UE 102 using a Radio Resource Control (RRC) protocol, e.g. as defined in 3GPP TS 38.331. RRC may enable a gNB (e.g. gNB 110-1) to request the UE 102 to transmit an UL SRS or UL PRS to enable the gNB 110-1 and/or other gNBs 110 to obtain UL location measurements of the transmitted UL SRS or UL PRS.

As previously noted, with a UE assisted position method, UE 102 may obtain location measurements (e.g. measurements of RSSI, Rx-Tx, RTT, Multi-RTT, AoA, reference signal time difference (RSTD), RSRP and/or RSRQ for gNBs 110, or ng-eNB 114 or WLAN APs, or measurements of GNSS pseudorange, code phase and/or carrier phase for SVs 190) and send the measurements to an entity performing a location server function, e.g., LMF 152, or SLP 162, for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 152 or SLP 162). With a network based position method, one or more base stations (e.g. gNBs 110) or APs may obtain location measurements (e.g. measurements of RSSI, RTT, AoD, RSRP, RSRQ, Rx-Tx or TOA for signals transmitted by UE 102) and/or may receive measurements obtained by UE 102, and may send the measurements to a location server, e.g., LMF 152, for computation of a location estimate for UE 102.

A gNB 110 in NG-RAN 112 may also broadcast positioning assistance data to UEs such as UE 102.

As illustrated, a Session Management Function (SMF) 156 connects the AMF 154 and the UPF 158. The SMF 156 may have the capability to control both a local and a central UPF within a PDU session. SMF 156 may manage the establishment, modification and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable support of location of UE 102 using SUPL. SLP 162 may be further connected to or accessible from external client 130.

It should be understood that while FIG. 1 shows a network architecture for a non-roaming UE, with suitable, well-known, changes, a corresponding network architecture may be provided for a roaming UE.

As discussed above, during a location session, the location server typically obtains the positioning capabilities from the UE 102, which is used to determine the type of positioning procedure and positioning measurement(s) to use during the location session, and to generate and provide any necessary assistance data to the UE 102 accordingly. The signaling between the location server (e.g., LMF 152 or SLP 162) and the UE 102 during the location session to obtain the positioning capabilities of the UE 102 increases latency in the location session. The positioning latency may be reduced if the positioning capabilities of the UE 102 could be obtained and stored in the core network 150 prior to initiating the location session. The positioning capabilities of the UE 102 could then be obtained for a location session without requiring signaling between the location server and the UE 102.

Storing the positioning capabilities for the UE 102 in the core network 150 may reduce the positioning latency in the range of approximately 50 to 100 ms. For some user cases, such as where there are low latency requirements (e.g. less than one second) (which may be associated with IIoT UEs or where the external LCS Client is a machine or server), a reduction in positioning latency from storing the positioning capabilities for the UE 102 in the core network 150 may be advantageous, while in other user cases (such as where the external LCS client is a person), the reduction in positioning latency may be negligible.

Moreover, the positioning capabilities of the UE 102 may not always be fixed (also referred to as being static) but may instead vary depending on the UE implementation, state and configuration by a user. For example, a user may be allowed to disable location support for non-regulatory services (e.g. for a location request from an external non-regulatory LCS Client 130). In that case, when a location server (e.g. LMF 152) requests the positioning capabilities of the UE 102, the UE 102 may reply with no positioning capabilities or with some limited minimal set of capabilities. An exception would be if the UE 102 is aware of an emergency services call when the UE 102 might provide its full capability set to a location server.

In another scenario, a Cellular Internet of Things (CIoT) UE whose battery level is low may switch off positioning support in order to conserve battery power for more important tasks such as communicating with an external server. In a third scenario, a user may establish certain location areas and/or times of day where and/or when the UE 102 will support location requests from a non-regulatory LCS Client by sending a minimal or zero set of positioning capabilities to a location server. An example of this case would be an employee at a hospital or airport who allows accurate location during working hours but no location after hours.

The examples and scenarios above may not be supported on all UEs 102 and may not always need to be supported, since a home Public Land Mobile Network (PLMN) can offer a subscription to different levels of privacy and location Quality of Service (QoS) in a home GMLC (HGMLC). However, a UE vendor may still offer users some form of control over UE location capability as described above.

Thus, the positioning capabilities of a UE 102 may not be static but may vary according to user preference or other external conditions like battery level. A consequence of varying positioning capabilities is that any positioning capabilities previously stored by the network could be in error at a later time.

Accordingly, in one implementation, the UE 102 may provide its positioning capabilities to the serving AMF 154 using NAS messaging, e.g. in a NAS Registration Request, prior to entering a location session. The AMF 154 stores the positioning capabilities for the UE 102 and later provides them to a location server, e.g., the LMF 152, as part of any location request for the UE 102 sent to the location server.

The positioning capabilities may be provided by the UE 102 using a different encoding than that used in LPP to provide positioning capabilities to an LMF 152, e.g., the positioning capabilities may be encoded using a new NAS parameter. However, this may increase both UE 102 and LMF 152 impacts to support the new encoding and decoding. In another implementation, the UE 102 may provide the positioning capabilities using existing LPP encoding, e.g., by including an LPP Provide Capabilities message in a NAS message (e.g. included in a new NAS parameter), which may still have a new signaling impact.

The UE 102 may resend its positioning capabilities to the AMF 154 whenever there is a change in the positioning capabilities, which may in principle support variation of UE 102 positioning capabilities. However, this would result in extra UE 102 and AMF 154 impact. Moreover, there may also be a privacy concern since sending positioning capabilities to a serving PLMN could effectively tell the serving PLMN when a user had disabled or reenabled location support in a UE 102. For example, a user (e.g., in a foreign country) may not want a local PLMN operator to be aware of changes in positioning capabilities. Accordingly, in one implementation, the UE 102 may provide positioning capabilities to an AMF 154 only when the positioning capabilities are fixed and will not change. The receipt of the positioning capabilities from the UE 102 in a NAS message, may thus be an implicit indication that the positioning capabilities are stable (and not variable) and the AMF 154 may store the positioning capabilities for the UE 102 accordingly.

Figure 2:
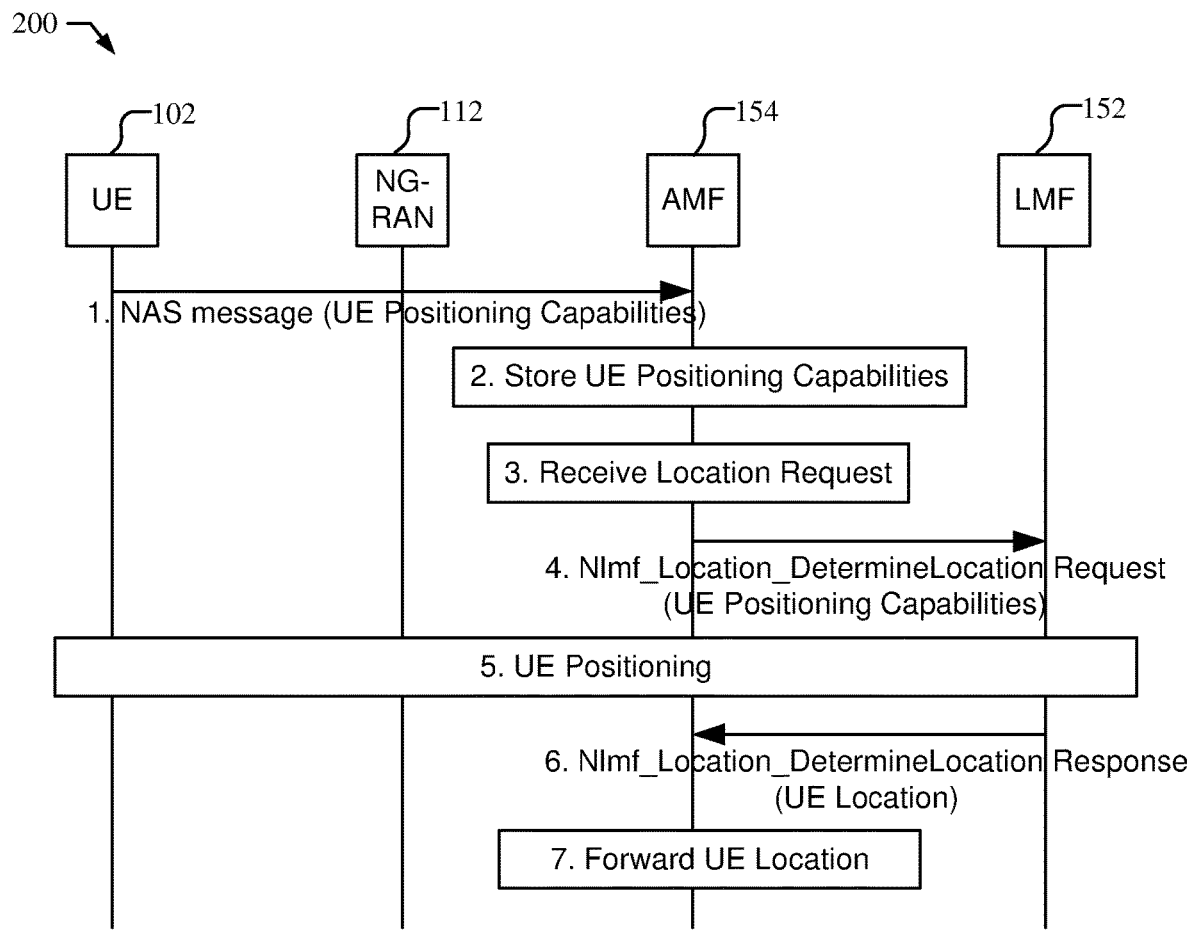
FIG. 2 shows a signaling flow that illustrates various messages sent between components of a communication system for storing UE positioning capabilities in a core network.

FIG. 2 shows a signaling flow 200 that illustrates various messages sent between components of the communication system 100 depicted in FIG. 1, prior to and during a location session for storing in the core network 150 positioning capabilities for the UE 102 provided by the UE 102 in a NAS message. FIG. 2 is provided as a nonlimiting example. For example, FIG. 2 illustrates the use of LMF 152 as the location server, but it should be understood that other types of location servers may be used, such as SLP 162 (shown in FIG. 1). Moreover, FIG. 2 illustrates the use of 5G network entities, but if desired, other types of networks may be used, such as entities in an LTE network, in which the NG-RAN 112 is replaced by an Evolved Universal Mobile Telecommunications System (UMTS) Terrestrial Radio Access Network (E-UTRAN), the AMF 154 is replaced by a Mobility Management Entity (MME), and LMF 152 is replaced by an E-SMLC. Additionally, it will be understood that any number of intervening devices that are not shown may relay signaling and assist in performing functions illustrated in FIG. 2. Moreover, additional signaling and processes may be present.

At stage 1, the UE 102 sends a NAS message to the AMF 154 that includes the UE positioning capabilities. The NAS message may be, e.g., a request for a NAS procedure, such as a NAS Registration Request, or may provide information to the AMF 154. The UE positioning capabilities may be encoded in a NAS parameter or may be provided using existing LPP encoding, e.g., in an LPP Provide Capabilities message in the NAS message. In one implementation, the UE 102 may include an explicit indication of whether the positioning capabilities of the UE 102 are stable (or non-variable). In another implementation, the UE 102 may send the positioning capabilities of the UE 102 to the AMF 154 only if the positioning capabilities are stable (i.e. are non-variable), and thus, the inclusion of the positioning capabilities in the NAS message is an implicit indication that the positioning capabilities for the UE 102 are stable.

At stage 2, the AMF 154 stores the UE positioning capabilities, e.g. if the positioning capabilities are indicated to be, or are implicitly, stable (non-variable).

At stage 3, the AMF 154 receives a location request for the UE 102. The location request, for example, may be received from the UE 102 or from a GMLC 160 (shown in FIG. 1).

At stage 4, the AMF 154 retrieves the UE positioning capabilities for the UE 102 from storage and sends to the LMF 152 a location request for the UE 102 that includes the UE positioning capabilities. For example, the AMF 154 may provide the location request and the UE positioning capabilities to the LMF 152 via an Nlmf_Location_DetermineLocation Request message.

At stage 5, the LMF 152 may initiate a location session and perform a positioning procedure with the UE 102 based on the UE positioning capabilities received at stage 4. During this location session, there is no need for the LMF 152 to request or receive the UE positioning capabilities from the UE 102 itself. The location of the UE 102 may be obtained by the LMF 152 during stage 5 using known positioning techniques, which may be selected based on the UE positioning capabilities received at stage 4.

At stage 6, the LMF 152 provides a location response to the AMF 154, which includes the UE location. For example, the LMF 152 may provide the location response in an Nlmf_Location_DetermineLocation Response message to the AMF 154.

At stage 7, the AMF 154 provides the UE location to the requesting entity, e.g., the UE 102 or the GMLC 160.

In one implementation, the UE 102 may provide its positioning capabilities to the LMF 152 using LPP during a location session, e.g., when requested by the LMF 152 as part of positioning the UE 102. The LMF 152 then stores the positioning capabilities for the UE 102 and uses them for any future location sessions with the UE. The AMF 154, for example, may include a UE identifier in location requests for the UE 102 that is associated with the UE positioning capabilities when stored by the LMF 152 to enable the LMF 152 to identify the UE 102 and retrieve its positioning capabilities in future location requests. The UE identifier, for example, may be a Subscription Permanent Identifier (SUPI) or Permanent Equipment Identifier (PEI) or some other AMF 154 determined identifier so that the SUPI and PEI for the UE 102 may be hidden from the LMF 152.

When storing the UE positioning capabilities in the LMF 152, the UE positioning capabilities may only be useful if the same LMF 152 is used later to position the UE 102 and not a different LMF 152. In addition, if the positioning capabilities of the UE 102 change at a later time, the LMF 152 may use incorrect positioning capabilities in subsequent location sessions. This last disadvantage may be overcome if the UE 102 also includes an indication (e.g., in an LPP Provide Capabilities message) as to whether its positioning capabilities are stable (i.e. are non-variable). A UE 102 whose positioning capabilities cannot change, for example, would indicate that its positioning capabilities are stable. Otherwise, the UE 102 may indicate that its positioning capabilities are not stable. For positioning capabilities that are not stable, the LMF 152, for example, may choose not to store them. A stability indicator may be useful because a very low latency requirement is most typically associated with an IIoT UE or some other autonomous UE without a user and accordingly disabling and reenabling of location should not occur and the positioning capabilities would be stable. In contrast, a UE 102 with a user (e.g., a smartphone or tablet) where location might be disabled and reenabled would not normally require extremely low latency even for an emergency call. Consequently, a restriction of positioning capability storage to UEs whose positioning capabilities are stable may not be much of a disadvantage to UEs with positioning capabilities that are not stable.

Figure 3:
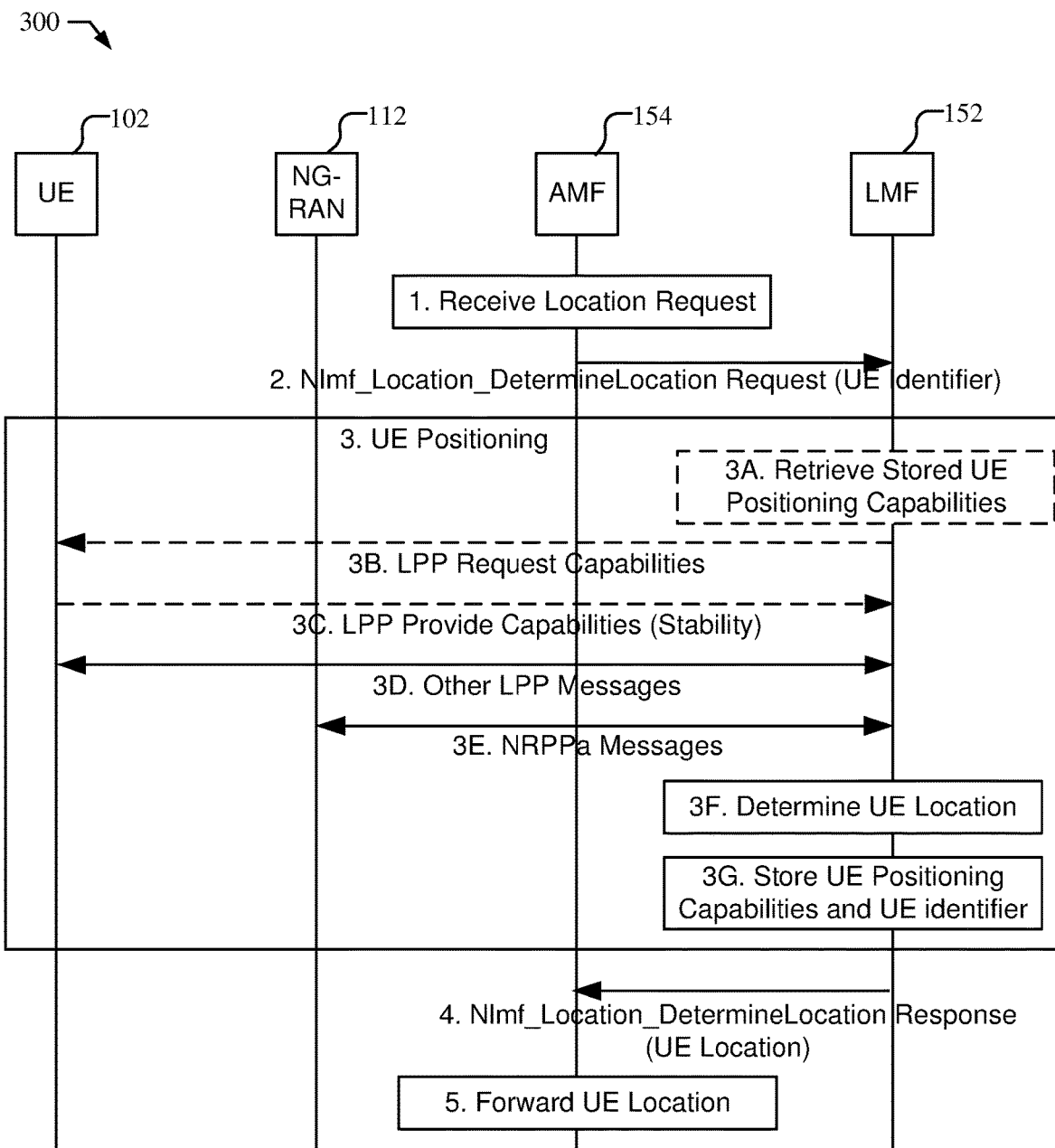
FIG. 3 shows a signaling flow that illustrates various messages sent between components of a communication system for storing UE positioning capabilities in a core network.

FIG. 3 shows a signaling flow 300 that illustrates various messages sent between components of the communication system 100 depicted in FIG. 1, for storing UE positioning capabilities in the LMF 152. FIG. 3 is provided as a nonlimiting example. For example, FIG. 3 illustrates the use of LMF 152 as the location server, but it should be understood that other types of location servers may be used, such as SLP 162 (shown in FIG. 1). Moreover, FIG. 3 illustrates the use of 5G network entities, but if desired, other types of networks may be used, such as entities in an LTE network, in which the NG-RAN 112 may be replaced by an E-UTRAN, the AMF 154 may be replaced by an MME, and LMF 152 may be replaced by an E-SMLC. Additionally, it will be understood that any number of intervening devices that are not shown may relay signaling and assist in performing functions illustrated in FIG. 3. Moreover, additional signaling and processes may be present.

At stage 1, the AMF 154 receives a location request for the UE 102. The location request, for example, may be received from the UE 102 or from a GMLC 160 (shown in FIG. 1).

At stage 2, the AMF 154 sends to the LMF 152 a location request for the UE 102 that includes a UE identifier. The UE identifier, for example, may be a SUPI or PEI for the UE 102 or may be another identifier for the UE 102 that is determined by the AMF 154 to hide the SUPI and PEI for the UE 102 from the LMF 152, e.g., for privacy. The location request and UE identifier may be provided by the AMF 154 to the LMF 152, e.g., via an Nlmf_Location_DetermineLocation Request message.

At block 3, which is illustrated with a number of stages, the LMF 152 may instigate a location session and perform a positioning procedure with the UE 102.

At stage 3A, if the UE positioning capabilities were stored by the LMF 152 in a previous location session (as discussed further in stage 3G), the LMF 152 may retrieve the stored positioning capabilities for the UE 102 based on the UE identifier received from the AMF 154 at stage 2.

At stage 3B, if the UE positioning capabilities for the UE 102 were not previously stored by the LMF 152, e.g., the UE positioning capabilities could not be located in storage in stage 3A, the LMF 152 may send a request for positioning capabilities to the UE 102, e.g., via an LPP Request Capabilities message. If the UE positioning capabilities for the UE 102 were retrieved in stage 3A, the LMF 152 would not send a request for positioning capabilities to the UE 102 in subsequent location sessions.

At stage 3C, and if stage 3B occurs, the UE 102 may provide its positioning capabilities to the LMF 152, e.g., via an LPP Provide Capabilities message. The UE 102 provides an indication of the stability of its positioning capabilities. For example, the indication of stability may indicate that the UE positioning capabilities are fixed and will not change, or may indicate that the UE positioning capabilities are not fixed and may vary. In some implementations, stage 3C may occur but not stage 3B—e.g. if the UE 102 sends its positioning capabilities to the LMF 152 unsolicited before LMF 152 is able to perform stage 3B.

At stage 3D, the LMF 152 and UE 102 exchange various LPP messages, e.g., to generate and obtain position information, such as positioning measurements performed by the UE 102, and/or a position determined by the UE 102, for positioning of the UE 102.

At stage 3E, the LMF 152 and one or more entities (e.g., gNBs 110) in the NG-RAN 112 may exchange various NRPPa messages e.g., to generate and obtain position information, such as positioning measurements performed by the gNBs 110, for positioning of the UE 102.

At stage 3F, the LMF 152 may determine the UE 102 location based on the position information received from the UE 102 and/or the NG-RAN 112 in stages 3D and 3E, respectively. The position measurements performed by the UE 102 in stage 3D and/or the NG-RAN 112 in stage 3E, and the location determination of the UE 102 may be determined by the LMF 152 using known positioning techniques, which may be selected by the LMF 152 based on the UE positioning capabilities obtained at stage 3A or stage 3C.

At stage 3G, if the LMF 152 has not previously stored the positioning capabilities for the UE 102, the LMF 152 stores the positioning capabilities for the UE 102 and the UE identifier if the UE 102 indicated that its positioning capabilities are stable (i.e. non-variable) in the positioning capabilities message received at stage 3C. The positioning capabilities for the UE 102 may thus be associated with the UE identifier, e.g., the SUPI or PEI, or the AMF generated identifier for the UE 102 received at stage 2, and stored by the LMF 152. If the UE 102 indicated that its positioning capabilities are not stable (i.e. can be variable), the LMF 152 may not store the UE positioning capabilities.

At stage 4, the LMF 152 provides a location response to the AMF 154, which includes the UE 102 location determined at stage 3F. For example, the LMF 152 may provide the location response in an Nlmf_Location_DetermineLocation Response message to the AMF 154.

At stage 5, the AMF 154 provides the UE location to the requesting entity, e.g., the UE 102 or the GMLC 160.

In another implementation, the UE 102 may provide its positioning capabilities to the LMF 152 using LPP during a location session, similar to the implementation discussed in FIG. 3, but the LMF 152 returns the UE 102 positioning capabilities to the AMF 154 along with the UE 102 location when the UE 102 positioning is complete. The AMF 154 then stores the positioning capabilities for the UE 102 and provides the positioning capabilities to the LMF 152 for any new location request for the UE 102. Thus, for an initial location request, the AMF 154 would not include UE positioning capabilities with a location request sent to the LMF 152, but would receive the UE positioning capabilities from the LMF 152. The AMF 154 may then include the positioning capabilities in any later UE 102 location request sent to the LMF 152 or to a different LMF. This implementation can overcome the limitation of restricting UE positioning capability storage to only one LMF 152.

Figure 4:
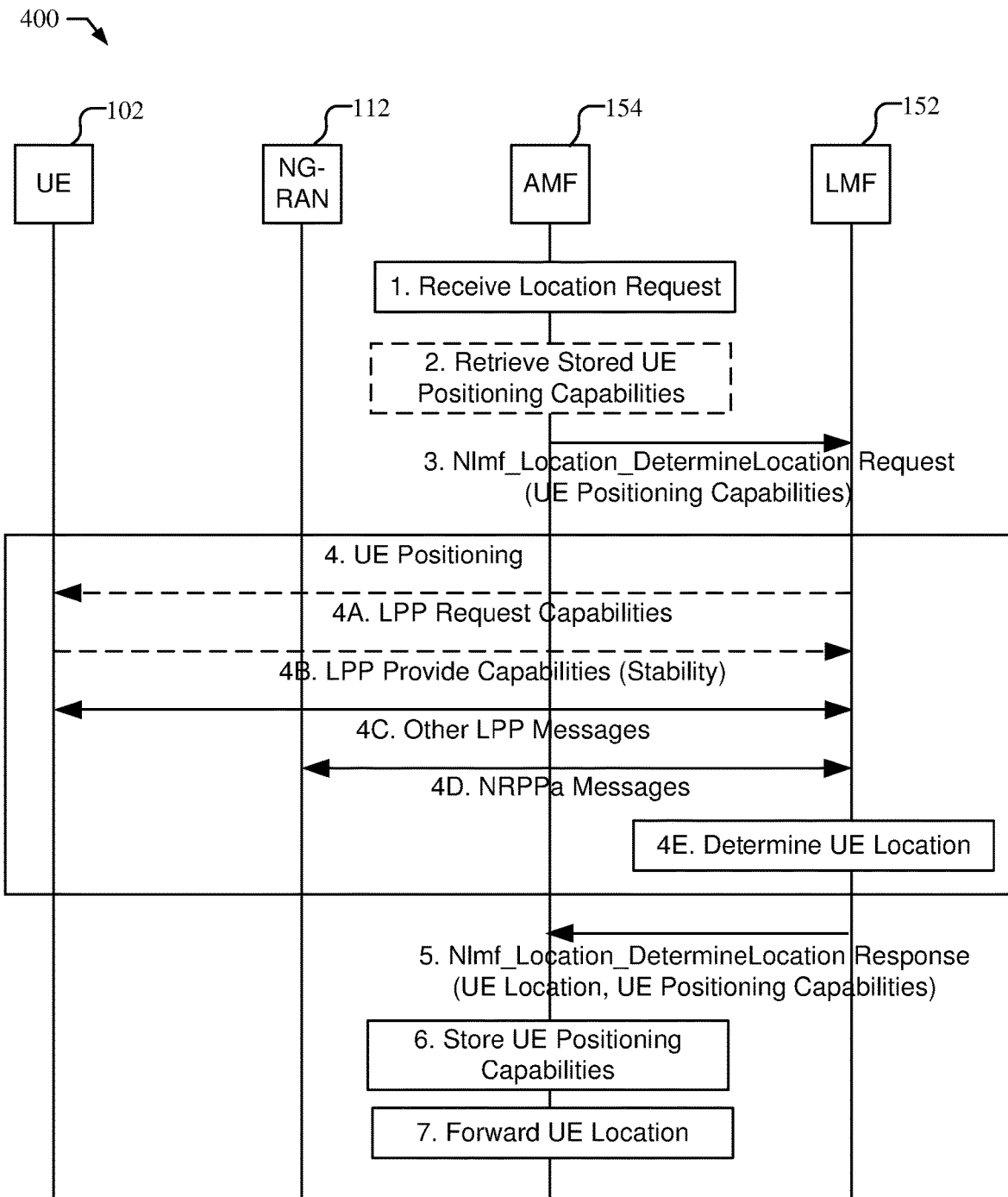
FIG. 4 shows a signaling flow that illustrates various messages sent between components of a communication system for storing UE positioning capabilities in a core network.

FIG. 4 shows a signaling flow 400 that illustrates various messages sent between components of the communication system 100 depicted in FIG. 1, for storing UE positioning capabilities received during a location session in the AMF 154. FIG. 4 is provided as a nonlimiting example. For example, FIG. 4 illustrates the use of LMF 152 as the location server, but it should be understood that other types of location servers may be used. Moreover, FIG. 4 illustrates the use of 5G network entities, but if desired, other types of networks may be used, such as entities in an LTE network, in which the NG-RAN 112 ma be replaced by an E-UTRAN, the AMF 154 may be replaced by an MME, and LMF 152 may be replaced by an E-SMLC. Additionally, it will be understood that any number of intervening devices that are not shown may relay signaling and assist in performing functions illustrated in FIG. 4. Moreover, additional signaling and processes may be present.

At stage 1, the AMF 154 receives a location request for the UE 102. The location request, for example, may be received from the UE 102 or from a GMLC 160 (shown in FIG. 1).

At stage 2, if the UE positioning capabilities were previously stored by the AMF 154 (as discussed further in stage 6), the AMF 154 may retrieve the stored UE positioning capabilities for the UE 102.

At stage 3, the AMF 154 sends to the LMF 152 a location request for the UE 102 that includes the UE positioning capabilities for the UE 102, if retrieved in stage 2. The location request and UE positioning capabilities (if included) may be provided by the AMF 154 to the LMF 152, e.g., via an Nlmf_Location_DetermineLocation Request message.

At block 4, which is illustrated with a number of stages, the LMF 152 may instigate a location session and perform a positioning procedure with the UE 102.

At stage 4A, if the UE positioning capabilities for the UE 102 were not provided in the location request received at stage 3, the LMF 152 may send a request for positioning capabilities to the UE 102, e.g., via an LPP Request Capabilities message. If the UE positioning capabilities for the UE 102 were received in stage 3, the LMF 152 would not send a request for positioning capabilities to the UE 102.

At stage 4B, and if stage 4A is performed, the UE 102 may provide its positioning capabilities to the LMF 152, e.g., via an LPP Provide Capabilities message. The UE 102 provides an indication of the stability of its positioning capabilities. For example, the indication of stability may indicate that the UE positioning capabilities are fixed and will not change, or may indicate that the UE positioning capabilities are not fixed and may vary. In some implementations, stage 4B may occur but not stage 4A—e.g. if the UE 102 sends its positioning capabilities to the LMF 152 unsolicited before LMF 152 is able to perform stage 4A.

At stage 4C, the LMF 152 and UE 102 exchange various LPP messages, e.g., to generate and obtain position information, such as positioning measurements performed by the UE 102, and/or a position determined by the UE 102, for positioning of the UE 102.

At stage 4D, the LMF 152 and one or more entities (e.g., gNBs 110) in the NG-RAN 112 may exchange various NRPPa messages e.g., to generate and obtain position information, such as positioning measurements performed by the gNBs 110, for positioning of the UE 102.

At stage 4E, the LMF 152 may determine the UE 102 location based on the position information received from the UE 102 and/or the NG-RAN 112 in stages 4C and 4D, respectively. The position measurements performed by the UE 102 in stage 4C and/or the NG-RAN 112 in stage 4D, and the location determination of the UE 102 may be determined by the LMF 152 using known positioning techniques, which may be selected by the LMF 152 based on the UE positioning capabilities obtained at stage 3 or stage 4B.

At stage 5, the LMF 152 provides a location response to the AMF 154, which includes the UE 102 location determined at stage 4E. For example, the LMF 152 may provide the location response in an Nlmf_Location_DetermineLocation Response message to the AMF 154. The location response may include the UE positioning capabilities for the UE 102 received at stage 4B if the UE 102 indicated that its positioning capabilities are stable (i.e. are non-variable). If the UE 102 indicated that its positioning capabilities are not stable (i.e. may vary), the LMF 152 may not include the UE positioning capabilities in the location response to the AMF 154.

At stage 6, if the AMF 154 receives the UE positioning capabilities for the UE 102 from the LMF 152 in the location response in stage 5, the AMF 154 stores the positioning capabilities for the UE 102.

At stage 7, the AMF 154 provides the UE location to the requesting entity, e.g., the UE 102 or the GMLC 160.

Figure 5:
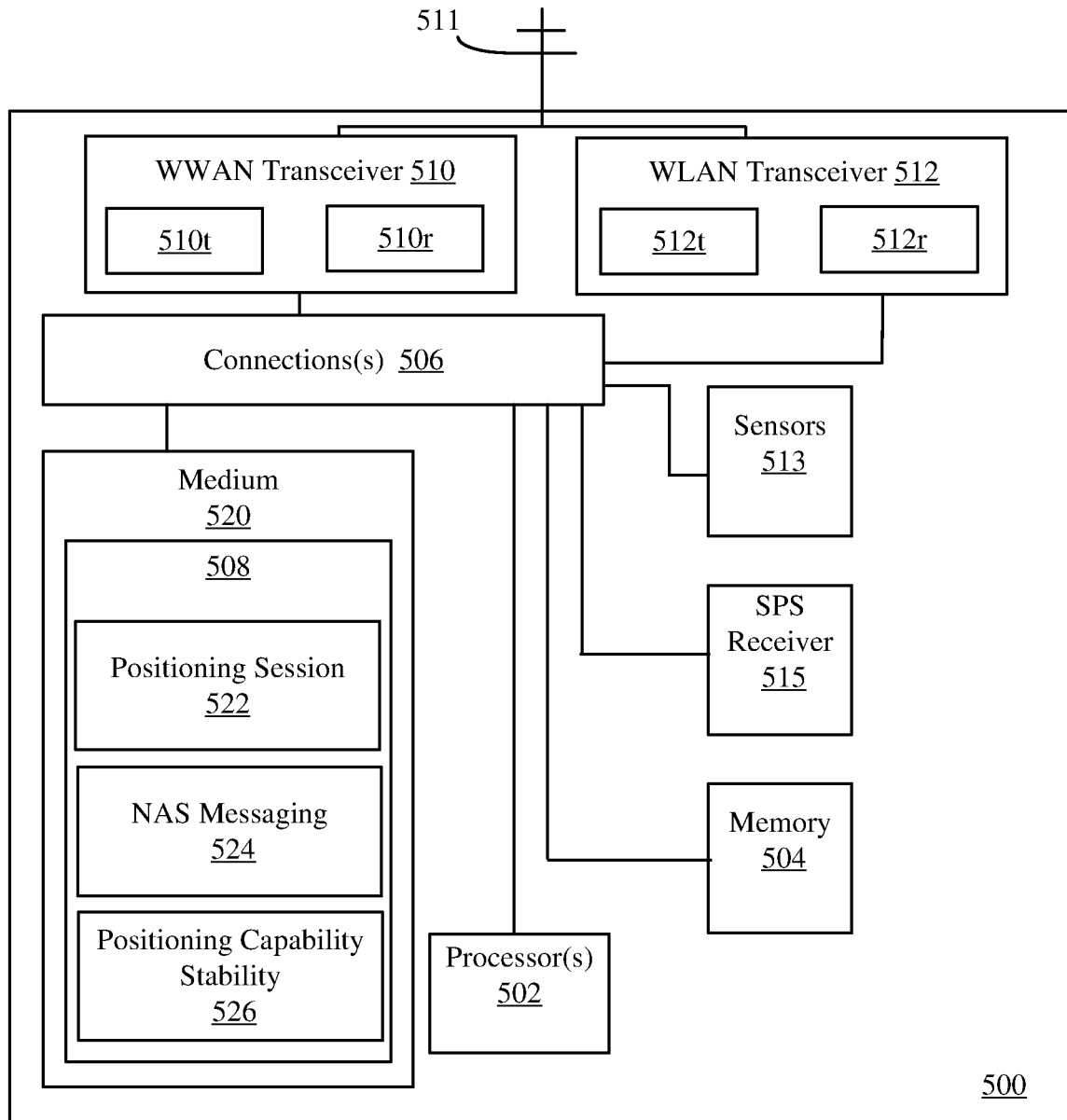
FIG. 5 shows a schematic block diagram illustrating certain exemplary features of a UE configured for storing UE positioning capabilities in a core network.

FIG. 5 shows a schematic block diagram illustrating certain exemplary features of a UE 500, e.g., which may be UE 102 shown in FIG. 1, that is configured for supporting location of the UE 500 by providing positioning capabilities for storage in the core network, e.g., as discussed herein. The UE 500, for example, may perform the signal flows shown in FIGS. 2, 3, and 4 and the process flow shown in FIG. 8 and techniques disclosed herein. The UE 500 may, for example, include one or more processors 502, memory 504, an external interface such as at least one wireless transceivers (e.g., wireless network interface) illustrated as WWAN transceiver 510 and WLAN transceiver 512, SPS receiver 515, and one or more sensors 513, which may be operatively coupled with one or more connections 506 (e.g., buses, lines, fibers, links, etc.) to non-transitory computer readable medium 520 and memory 504. The SPS receiver 515, for example, may receive and process SPS signals from SVs 190 shown in FIG. 1. The one or more sensors 513, for example, may be an inertial measurement unit (IMU) that may include one or more accelerometers, one or more gyroscopes, a magnetometer, etc. The UE 500 may further include additional items, which are not shown, such as a user interface that may include e.g., a display, a keypad or other input device, such as virtual keypad on the display, through which a user may interface with the UE. In certain example implementations, all or part of UE 500 may take the form of a chipset, and/or the like.

The at least one wireless transceivers may be a transceiver 510 for a WWAN communication system and a transceiver 512 for a WLAN communication system, or may be a combined a transceiver for both WWAN and WLAN. The WWAN transceiver 510 may include a transmitter 510*t* and receiver 510*r* coupled to one or more antennas 511 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 512 may include a transmitter 512*t* and receiver 512*r* coupled to one or more antennas 511 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 510*t* and 512*t* may include multiple transmitters that may be discrete components or combined/integrated components, and/or the receivers 510*r* and 512*r* may include multiple receivers that may be discrete components or combined/integrated components. The WWAN transceiver 510 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 512 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 510 and 512 may be communicatively coupled to a transceiver interface, e.g., by optical and/or electrical connection, which may be at least partially integrated with the transceivers 510 and 512.

In some embodiments, UE 500 may include antenna 511, which may be internal or external. UE antenna 511 may be used to transmit and/or receive signals processed by wireless transceivers 510 and 512. In some embodiments, UE antenna 511 may be coupled to wireless transceivers 510 and 512. In some embodiments, measurements of signals received (transmitted) by UE 500 may be performed at the point of connection of the UE antenna 511 and wireless transceivers 510 and 512. For example, the measurement point of reference for received (transmitted) RF signal measurements may be an input (output) terminal of the receiver 510*r* (transmitter 510*t*) and an output (input) terminal of the UE antenna 511. In a UE 500 with multiple UE antennas 511 or antenna arrays, the antenna connector may be viewed as a virtual point representing the aggregate output (input) of multiple UE antennas. In some embodiments, UE 500 may measure received signals including signal strength and TOA measurements and the raw measurements may be processed by the one or more processors 502.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include positioning session module 522 that when implemented by the one or more processors 502 configures the one or more processors 502 to engage in a positioning session with a location server through a serving base station, e.g., via the wireless transceiver 510, including receiving positioning capabilities request message, receiving a request of location information, such as positioning measurements, e.g., for a UE-assisted positioning process, or a position estimate, e.g., for a UE based positioning process. The one or more processors 502 are configured to send a response to the location service requests, e.g. by providing positioning capabilities and the requested location information. The one or more processors 502 may be configured to send, via transceiver 510, a positioning capabilities response with an indication of the stability of the positioning capabilities.

The medium 520 and/or memory 504 may include a NAS messaging module 524 that when implemented by the one or more processors 502 configures the one or more processors 502 to send, via the transceiver 510, NAS messages to an AMF, and to include the UE positioning capabilities encoded in a NAS parameter or encoded in an LPP message. The one or more processors 502 may be configured to include an indication of the stability of the positioning capabilities or to include the positioning capabilities in a NAS message only if the positioning capabilities are stable.

The medium 520 and/or memory 504 may include a positioning capability stability module 526 that when implemented by the one or more processors 502 configures the one or more processors 502 to determine when the positioning capabilities are stable, e.g., fixed and will not change.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program code 508. For example, the non-transitory computer readable medium including program code 508 stored thereon may include program code 508 to support location of the UE by storing UE positioning capabilities in the core network in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a wireless transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable program code 508 stored thereon, which if executed by one or more processors 502 may be operatively enabled to perform all or portions of the example operations as described herein. Computer readable medium 520 may be a part of memory 504.

Figure 6:
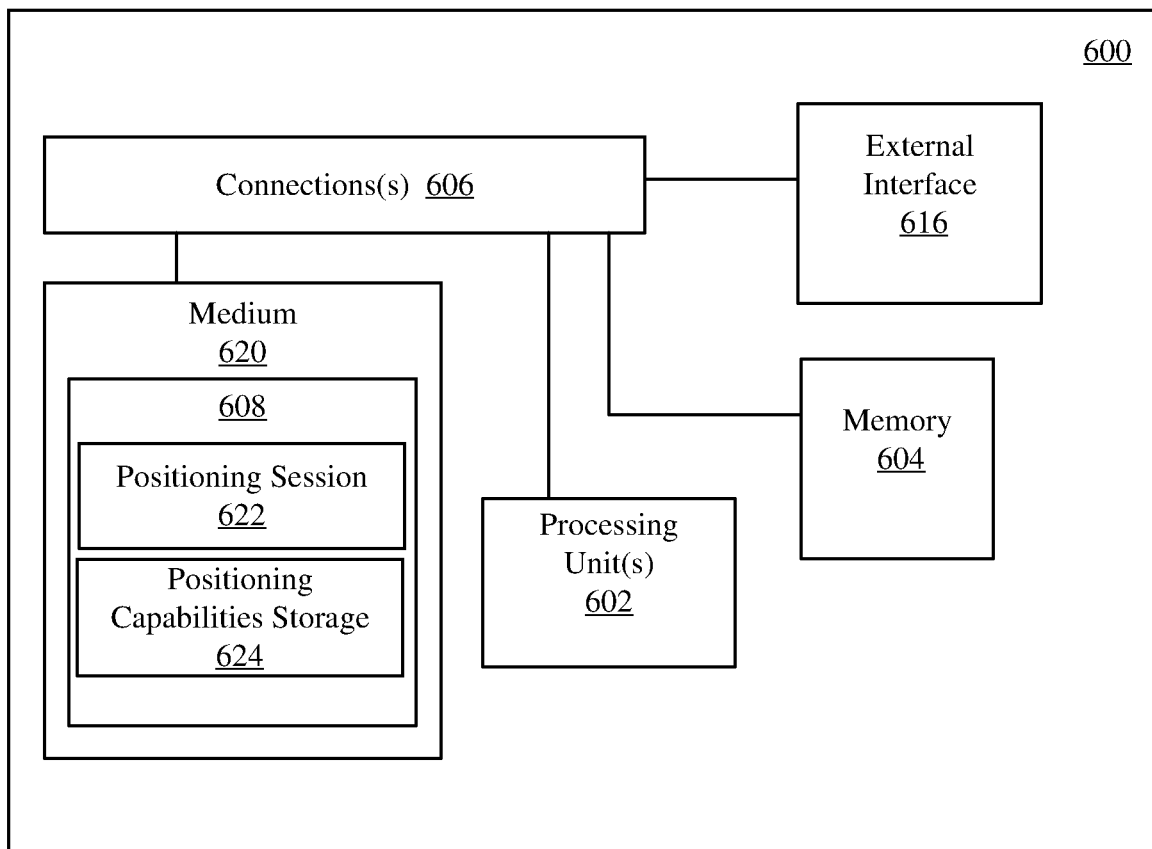
FIG. 6 shows a schematic block diagram illustrating certain exemplary features of a location server configured for storing UE positioning capabilities in a core network.

FIG. 6 shows a schematic block diagram illustrating certain exemplary features of a location server 600, e.g., LMF 152 or SLP 162, shown in FIG. 1, or an E-SMLC that is configured to support positioning of a UE (e.g. a UE 102) by enabling the storage of UE positioning capabilities in a core network, as discussed herein. The location server 600 may perform the signaling flow show in in FIGS. 2, 3, and 4 and the process flow, e.g., shown in FIG. 9 and algorithms disclosed herein. Location server 600 may, for example, include one or more processors 602, memory 604, an external interface 616 (e.g., wireline or wireless network interface to base stations and/or entities in the core network), which may be operatively coupled with one or more connections 606 (e.g., buses, lines, fibers, links, etc.) to non-transitory computer readable medium 620 and memory 604. In certain example implementations, all or part of location server 600 may take the form of a chipset, and/or the like.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include a positioning session module 622 that when implemented by the one or more processors 602 configures the one or more processors 602 to engage in a positioning session with a UE through a serving base station and AMF via the external interface 616, e.g., as discussed herein, including receiving location service requests that include UE positioning capabilities or a UE identifier, and for obtaining UE positioning capabilities, e.g., from storage or by sending a request for positioning capabilities to the UE, and sending a request of location information, such as positioning measurements, e.g., for a UE-assisted positioning process, or a position estimate, e.g., for a UE based positioning process. The one or more processors 602 are configured to receive responses to the location service requests, e.g. including receiving positioning capabilities including an indication of the stability of the UE positioning capabilities and the requested location information from a UE. The one or more processors 602 may be further configured to determine a position estimate for the UE based on received positioning measurements, which as Rx-Tx, AoA, TOA, RSRP, etc., or other types of measurements, such as using WiFi or SPS measurements. The one or more processors 602 may be configured to send, via the external interface 616 a location response to the AMF, which may include the determined UE location and, in some implementations, the UE positioning capabilities, if indicated as being stable by the UE.

The medium 620 and/or memory 604 may include a positioning capabilities storage module 624 that when implemented by the one or more processors 602 configures the one or more processors 602 to enable storage of the UE positioning capabilities in the core network when the UE indicates that its positioning capabilities are stable. For example, the one or more processors 602 may be enabled to store the UE positioning capabilities in the location server 600, e.g., in memory 604 or another storage medium, when the UE positioning capabilities are indicated as being stable. The one or more processors 602 may be configured to associate the UE positioning capabilities with a UE identifier received from the AMF in a location request. The one or more processors 602 may be further configured to retrieve the UE positioning capabilities from storage using the UE identifier received from the AMF in a location request. In another example, the one or more processors 602 may be enabled to store the UE positioning capabilities by sending the UE positioning capabilities to the AMF for storage, when the UE positioning capabilities are indicated as being stable. For example, the one or more processors 602 may be enabled to send the UE positioning capabilities to the AMF in a location response.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support location of the UE by enabling storage of the UE positioning capabilities in the core network in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface 616 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
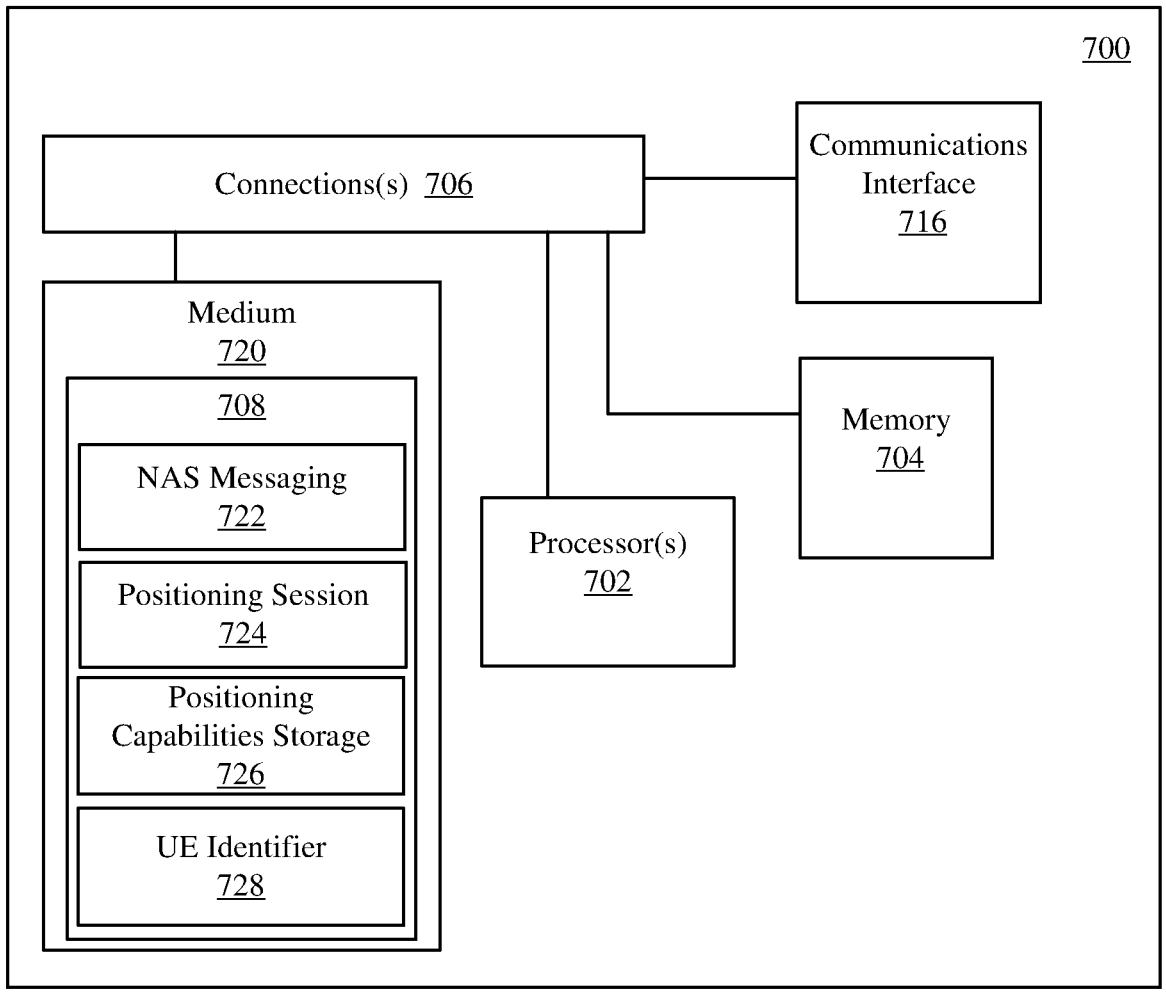
FIG. 7 shows a schematic block diagram illustrating certain exemplary features of an entity in a core network.

FIG. 7 shows a schematic block diagram illustrating certain exemplary features of an AMF 700, such as the AMF 154 in FIG. 1, enabled to support positioning of a UE (e.g. a UE 102) by enabling the storage of UE positioning capabilities in the core network, as discussed herein. The AMF 700 may perform the signaling flows shown in FIGS. 2, 3, and 4 and the process flow, e.g., shown in FIG. 10 and techniques disclosed herein. AMF 700 may, for example, include one or more processors 702, memory 704, an external interface 716 (e.g., wireline or wireless network interface to other NG-RAN entities and entities in the core network such as a GMLC and location server directly or via one or more intervening entities), which may be operatively coupled with one or more connections 706 (e.g., buses, lines, fibers, links, etc.) to non-transitory computer readable medium 720 and memory 704. The AMF 700 may further include additional items, which are not shown, such as a user interface that may include e.g., a display, a keypad or other input device, such as virtual keypad on the display, through which a user may interface with the AMF. In certain example implementations, all or part of AMF 700 may take the form of a chipset, and/or the like. It is noted that the AMF 700 shown in FIG. 7 may in some cases correspond to (e.g. perform the functions of) some other type of core network node such as an MME.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of AMF 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in AMF 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors. A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in AMF 700 is merely exemplary, and as such the functionality of the modules and/or data structures may be combined, separated, and/or be structured in different ways depending upon the implementation of the AMF 700.

The medium 720 and/or memory 704 may include a NAS messaging module 722 that when implemented by the one or more processors 702 configures the one or more processors 702 to receive, via the external interface 716, NAS messages from the UE which may include the UE positioning capabilities encoded in a NAS parameter or encoded in an LPP message. The NAS message may include an explicit or implicit indication of whether the UE positioning capabilities are stable.

The medium 720 and/or memory 704 may include a positioning session module 724 that when implemented by the one or more processors 702 configures the one or more processors 702 to initiate and engage in a positioning session between a LMF and UE through a serving base station via the external interface 716, e.g., as discussed herein, including receiving a location request for a UE, e.g., from the UE or a GMLC and sending a location request for the UE to the LMF and to receive a location response from the LMF that includes the location of the UE and to forward the location of the UE to the initiating entity, e.g., the UE or GMLC. The one or more processors 702 may be configured to include a UE identifier in the location request sent to the LMF. The one or more processors 702 may be configured to include UE positioning capabilities for the UE if stored in the AMF 700. The one or more processors 702 to receive, via the external interface 716, the UE positioning capabilities for the UE in a location response from the LMF.

The medium 720 and/or memory 704 may include a positioning capabilities storage module 726 that when implemented by the one or more processors 702 configures the one or more processors 702 to enable storage of the UE positioning capabilities in the core network when the UE indicates that its positioning capabilities are stable. For example, the one or more processors 702 may be enabled to store the UE positioning capabilities in the AMF 700, e.g., in memory 704 or another storage medium, when there is a NAS message with an explicit or implicit indication that the UE positioning capabilities are stable. The one or more processors 702 may be enabled to store the UE positioning capabilities in the AMF 700, e.g., in memory 704 or another storage medium, when the UE positioning capabilities are received from the LMF in a location response message. The one or more processors 702 may be further configured to retrieve the UE positioning capabilities from storage and including the UE positioning capabilities in a location request sent to the LMF.

The medium 720 and/or memory 704 may include a UE identifier module 728 that when implemented by the one or more processors 702 configures the one or more processors 702 to generate an identifier for the UE and to include the UE identifier in a location request sent to the LMF, via the external interface 716. The UE identifier, for example, may be a SUPI or PEI for the UE or may be generated by the AMF 700 to hide the SUPI and PEI for the UE from the location server, e.g., for privacy considerations.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support location of the UE by enabling storage of the UE positioning capabilities in the core network in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include an external interface 716 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
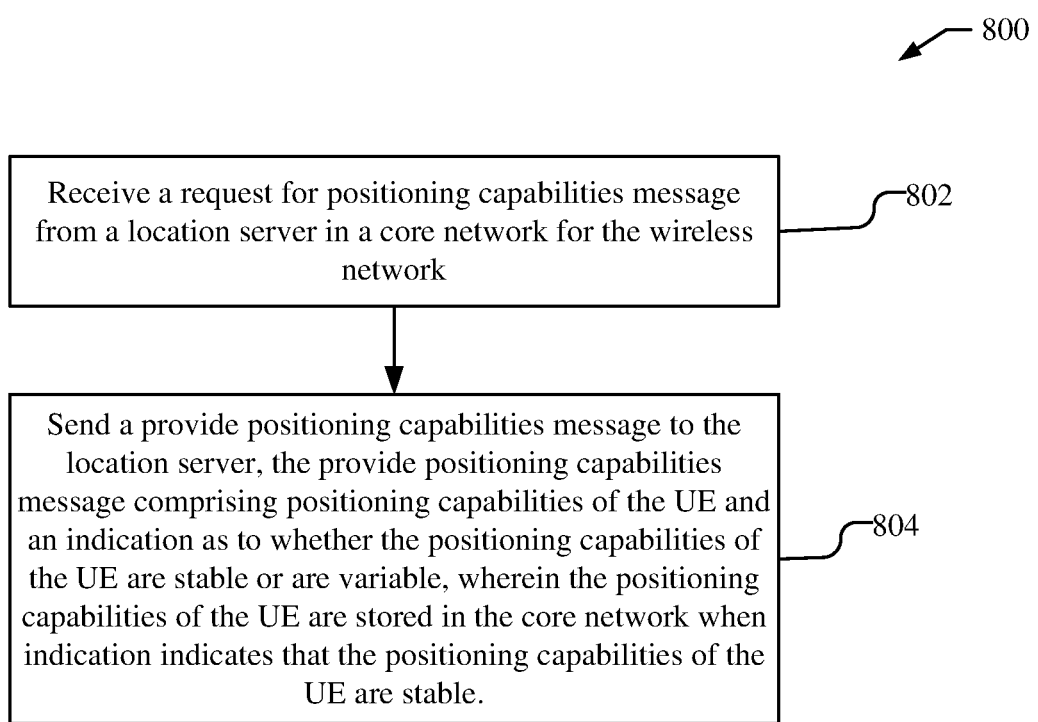
FIG. 8 shows a flowchart for an exemplary method for supporting location services for a UE performed by the UE.

FIG. 8 shows a flowchart for an exemplary method 800 for supporting positioning of a User Equipment (UE) in wireless network, performed by the UE, such as the UE 102 shown in FIG. 1, in a manner consistent with disclosed implementations.

At block 802, the UE receives a request for positioning capabilities message from a location server in a core network for the wireless network, e.g., as illustrated in stage 3B of FIG. 3 and stage 4A of FIG. 4. A means for receiving a request for positioning capabilities message from a location server in a core network for the wireless network may include, e.g., the wireless transceiver 510 and one or more processors 502 with dedicated hardware or implementing executable code or software instructions in memory 504 and/or medium 520 in UE 500, such as the positioning session module 522, shown in FIG. 5.

At block 804, the UE sends a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable, e.g., as illustrated in stages 3C and 3G of FIG. 3 and stages 4B and 6 of FIG. 4. A means for sending a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable may include, e.g., the wireless transceiver 510 and one or more processors 502 with dedicated hardware or implementing executable code or software instructions in memory 504 and/or medium 520 in UE 500, such as the positioning session module 522 and positioning capability stability module 526, shown in FIG. 5.

In some implementations, the indication as to whether the positioning capabilities of the UE are stable or are variable identifies whether the positioning capabilities of the UE will be valid (i.e. fixed) over time or may change over time.

In some implementations, the positioning capabilities of the UE may be stored in the location server. In some implementations, the positioning capabilities of the UE may be stored in a second entity in the core network. For example, the location server may be a Location Management Function (e.g. an LMF 152) and the second entity may be an Access and Mobility Management Function (e.g. an AMF 154). The UE may be, e.g., an Industrial Internet of Things (IIoT) UE with fixed positioning capabilities and the indication indicates that the positioning capabilities of the UE are stable.

In some implementations, the request for positioning capabilities message is a positioning message for a first location session, wherein the indication indicates that the positioning capabilities of the UE are stable. The UE may then further receive positioning messages for a second location session that is subsequent to the first location session, wherein the positioning messages for the second location session do not include a request for positioning capabilities message, e.g., as discussed in stage 3B of FIG. 3 and stage 4A of FIG. 4. The second location session, for example, may include the location server. The second location session, for example, may include a second location server different to the location server. A means for receiving positioning messages for a second location session that is subsequent to the first location session, wherein the positioning messages for the second location session do not include a request for positioning capabilities message may include, e.g., the wireless transceiver 510 and one or more processors 502 with dedicated hardware or implementing executable code or software instructions in memory 504 and/or medium 520 in UE 500, such as the positioning session module 522 and positioning capability stability module 526, shown in FIG. 5.

Figure 9:
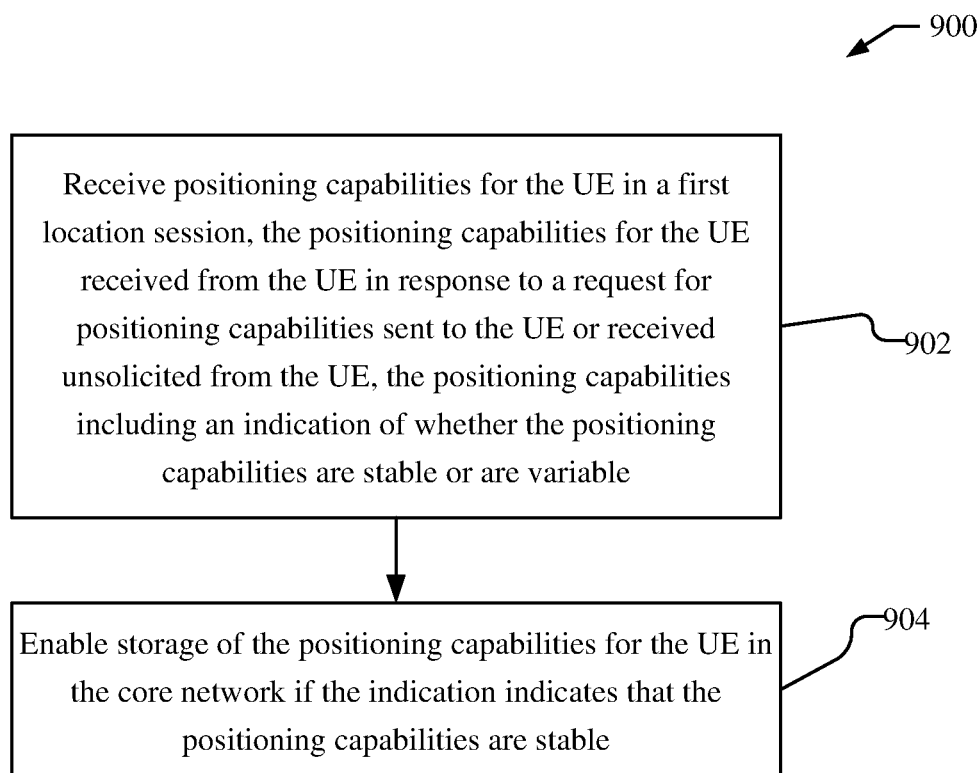
FIG. 9 shows a flowchart for an exemplary method for supporting location services for a UE performed by a location server.

FIG. 9 shows a flowchart for an exemplary method 900 for supporting positioning of a User Equipment (e.g. a UE 102) in a wireless network performed by a location server, such as LMF 152 shown in FIG. 1, in a manner consistent with disclosed implementations.

At block 902, the location server may receive positioning capabilities for the UE in a first location session, where the positioning capabilities for the UE are received from the UE in response to a request for positioning capabilities sent to the UE or are received unsolicited from the UE, and where the positioning capabilities include an indication of whether the positioning capabilities are stable or are variable, e.g., as illustrated in stage 3C of FIG. 3 and stage 4B of FIG. 4. A means for receiving positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable may include, e.g., the external interface 616 and one or more processors 602 with dedicated hardware or implementing executable code or software instructions in memory 604 and/or medium 620 in location server 600, such as the positioning session module 622, shown in FIG. 6.

At block 904, the location server enables storage of the positioning capabilities for the UE in the core network if the indication indicates that the positioning capabilities are stable, e.g., as illustrated in stage 3G of FIG. 3 or stages 5 and 6 of FIG. 4. A means for enabling storage of the positioning capabilities for the UE in the core network if the indication indicates that the positioning capabilities are stable may include, e.g., the external interface 616 and one or more processors 602 with dedicated hardware or implementing executable code or software instructions in memory 604 and/or medium 620 in location server 600, such as the positioning session module 622 and the positioning capabilities storage module 624, shown in FIG. 6.

In some implementations, the indication of whether the positioning capabilities are stable or are variable identifies whether the positioning capabilities will be valid (i.e. fixed) over time or may change over time.

In one implementation, the location server may further perform a second location session with the UE that is subsequent to the first location session, e.g., as discussed in stage 3A of FIG. 3 and stage 2 of FIG. 4. A means for performing a second location session with the UE that is subsequent to the first location session may include, e.g., the external interface 616 and one or more processors 602 with dedicated hardware or implementing executable code or software instructions in memory 604 and/or medium 620 in location server 600, such as the positioning session module 622, shown in FIG. 6. The location server may obtain the positioning capabilities for the UE stored in the core network to enable the performing of the second location session, e.g., as discussed at stage 3A of FIG. 3 or stage 3 of FIG. 4. A means for obtaining the positioning capabilities for the UE stored in the core network to enable the performing of the second location session may include, e.g., the external interface 616 and one or more processors 602 with dedicated hardware or implementing executable code or software instructions in memory 604 and/or medium 620 in location server 600, such as the positioning session module 622, shown in FIG. 6. The enabling storage of the positioning capabilities for the UE in the core network, for example, may comprise storing the positioning capabilities in the location server, e.g., as discussed at stage 3G of FIG. 3. The location server may then further receive a first location request for the UE for the first location session from a second entity in the core network, where the first location request comprises a UE identification, e.g., as discussed at stage 2 of FIG. 3. A means for receiving a first location request for the UE for the first location session from a second entity in the core network, wherein the first location request comprises a UE identification (or a UE identifier) may include, e.g., the external interface 616 and one or more processors 602 with dedicated hardware or implementing executable code or software instructions in memory 604 and/or medium 620 in location server 600, such as the positioning session module 622, shown in FIG. 6. The location server may then store the UE identification in association with the positioning capabilities in the location server, e.g., as discussed at stage 3G of FIG. 3. For example, the location server may store both the positioning capabilities and the UE identification. A means for storing the UE identification in association with the positioning capabilities in the location server may include, e.g., the one or more processors 602 with dedicated hardware or implementing executable code or software instructions in memory 604 and/or medium 620 in location server 600, such as the positioning capabilities storage module 624, shown in FIG. 6. The location server may then receive a second location request for the UE for the second location session from the second entity, where the second location request comprises the UE identification, and where obtaining the positioning capabilities for the UE stored in the core network is based on the UE identification, e.g., as discussed at stages 2 and 3A of FIG. 3. A means for receiving a second location request for the UE for the second location session from the second entity, wherein the second location request comprises the UE identification, and wherein obtaining the positioning capabilities for the UE stored in the core network is based on the UE identification may include, e.g., the external interface 616 and one or more processors 602 with dedicated hardware or implementing executable code or software instructions in memory 604 and/or medium 620 in location server 600, such as the positioning session module 622 and the positioning capabilities storage module 624, shown in FIG. 6. The location server, for example, may be a Location Management Function (e.g. an LMF 152) and the second entity may be an Access and Mobility Management Function (e.g. an AMF 154).

In one implementation, enabling storage of the positioning capabilities for the UE in the core network, for example, comprises sending the positioning capabilities to a second entity in the core network for storage in the second entity, e.g., as discussed at stage 5 of FIG. 4. The location server may further send a location response for the first location session to the second entity, where the positioning capabilities are included in the location response, e.g., as discussed at stage 5 of FIG. 4. A means for sending a location response for the first location session to the second entity, wherein the positioning capabilities are included in the location response may include, e.g., the external interface 616 and one or more processors 602 with dedicated hardware or implementing executable code or software instructions in memory 604 and/or medium 620 in location server 600, such as the positioning session module 622 and the positioning capabilities storage module 624, shown in FIG. 6. The location server may obtain the positioning capabilities for the UE stored in the core network by receiving a location request for the second location session from the second entity, where the location request includes the positioning capabilities for the UE stored in the second entity, e.g., as discussed at stage 3 of FIG. 4. A means for receiving a location request for the second location session from the second entity, wherein the location request includes the positioning capabilities for the UE stored in the second entity may include, e.g., the external interface 616 and one or more processors 602 with dedicated hardware or implementing executable code or software instructions in memory 604 and/or medium 620 in location server 600, such as the positioning session module 622, shown in FIG. 6. The location server, for example, may be a Location Management Function (e.g. an LMF 152) and the second entity may be an Access and Mobility Management Function (e.g. an AMF 154).

Figure 10:
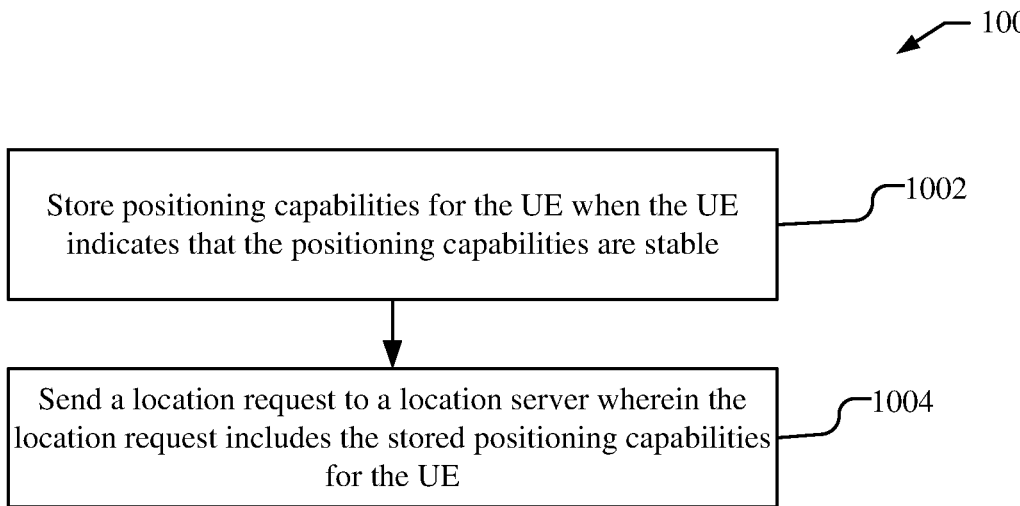
FIG. 10 shows a flowchart for an exemplary method for supporting location services for a UE performed by an entity in a core network.

FIG. 10 shows a flowchart for an exemplary method 1000 for supporting positioning of a User Equipment (e.g. a UE 102) in a wireless network performed by a first entity in a core network of the wireless network, such as AMF 154 shown in FIG. 1, in a manner consistent with disclosed implementations.

At block 1002, the first entity may store positioning capabilities for the UE when the UE indicates that the positioning capabilities are stable (e.g. are not variable), e.g., as discussed in stage 2 of FIG. 2 and stage 6 of FIG. 4. A means for storing positioning capabilities for the UE when the UE indicates that the positioning capabilities are stable may include, e.g., the external interface 716 and one or more processors 702 with dedicated hardware or implementing executable code or software instructions in memory 704 and/or medium 720 in AMF 700, such as the positioning capabilities storage module 726, shown in FIG. 7.

At block 1004, the first entity may send a location request to a location server where the location request includes the stored positioning capabilities for the UE, e.g., as discussed at stage 4 of FIG. 2 and stage 3 of FIG. 4. The first entity, for example, may be an Access and Mobility Management Function (e.g. an AMF 154) and the location server may be a Location Management Function (e.g. an LMF 152). A means for sending a location request to a location server wherein the location request includes the stored positioning capabilities for the UE may include, e.g., the external interface 716 and one or more processors 702 with dedicated hardware or implementing executable code or software instructions in memory 704 and/or medium 720 in AMF 700, such as the positioning session module 724, shown in FIG. 7.

In one implementation, the first entity may receive a Non-Access Stratum (NAS) message from the UE, where the NAS message includes the positioning capabilities for the UE and an indication of whether the positioning capabilities are stable or are variable, e.g., as discussed at stage 1 of FIG. 2. A means for receiving a Non-Access Stratum (NAS) message from the UE, the NAS message including the positioning capabilities for the UE and an indication of whether the positioning capabilities are stable may include, e.g., the external interface 716 and one or more processors 702 with dedicated hardware or implementing executable code or software instructions in memory 704 and/or medium 720 in AMF 700, such as the NAS messaging module 722, shown in FIG. 7. The positioning capabilities in the NAS message may be included in a Long Term Evolution (LTE) Positioning Protocol (LPP) Provide Capabilities message, e.g. included as a parameter in the NAS message.

In one implementation, the first entity may receive the positioning capabilities for the UE for storage from a second entity in the core network in response to the second entity receiving from the UE the positioning capabilities for the UE and an indication that the positioning capabilities are stable (e.g. are not variable), e.g., as discussed in stages 4B and 5 of FIG. 4. A means for receiving the positioning capabilities for the UE for storage from a second entity in the core network in response to the second entity receiving from the UE the positioning capabilities for the UE and an indication that the positioning capabilities are stable may include, e.g., the external interface 716 and one or more processors 702 with dedicated hardware or implementing executable code or software instructions in memory 704 and/or medium 720 in AMF 700, such as the positioning session module 724, shown in FIG. 7. The positioning capabilities may be received in a location response sent by the second entity for a first location session, and the location request sent to the location server may be for a second location session that is subsequent to the first location session, e.g., as discussed in stages 3 and 5 of FIG. 4. The second entity, for example, may be the location server. The second entity, for example, may be a second location server that is different than the location server.

Figure 11:
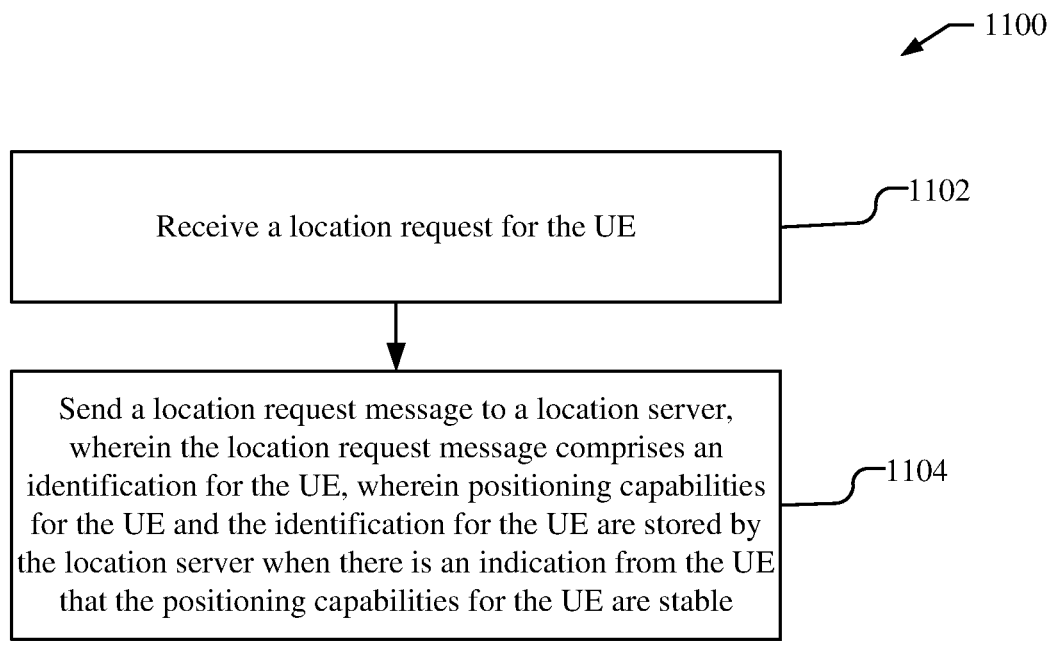
FIG. 11 shows a flowchart for an exemplary method for supporting location services for a UE performed by an entity in a core network.

FIG. 11 shows a flowchart for an exemplary method 1100 for supporting positioning of a User Equipment (e.g. a UE 102) in a wireless network performed by a first entity in a core network of the wireless network, such as AMF 154 shown in FIG. 1, in a manner consistent with disclosed implementations.

At block 1102, the first entity receives a location request for the UE, as illustrated at stage 1 of FIG. 3. A means for receiving a location request for the UE may include, e.g., the external interface 716 and one or more processors 702 with dedicated hardware or implementing executable code or software instructions in memory 704 and/or medium 720 in AMF 700, such as the positioning session module 724, shown in FIG. 7.

At block 1104, the first entity sends a location request message to a location server, where the location request message comprises an identification (e.g. an identifier) for the UE, and where positioning capabilities for the UE and the identification for the UE are stored by the location server when there is an indication from the UE that the positioning capabilities for the UE are stable (e.g. are not variable), e.g., as discussed at stages 2, 3A and 3G of FIG. 3. The identification for the UE, for example, may be a Subscription Permanent Identifier (SUPI) or a Permanent Equipment Identifier (PEI) for the UE. The identification for the UE, for example, may be an identifier generated by the first entity. A means for sending a location request message to a location server, wherein the location request message comprises an identification for the UE, wherein positioning capabilities for the UE and the identification for the UE are stored by the location server when there is an indication from the UE that the positioning capabilities for the UE are stable may include, e.g., the external interface 716 and one or more processors 702 with dedicated hardware or implementing executable code or software instructions in memory 704 and/or medium 720 in AMF 700, such as the positioning session module 724 and UE identifier module 728, shown in FIG. 7. The first entity, for example, may be an Access and Mobility Management Function (e.g. an AMF 154) and the location server may be a Location Management Function (e.g. an LMF 152).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In view of this description embodiments may include different combinations of features. Implementation examples are described in the following numbered clauses:

Clause 1. A method performed by a User Equipment (UE) for supporting positioning of the UE in a wireless network, comprising: receiving a request for positioning capabilities message from a location server in a core network for the wireless network; and sending a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

Clause 2. The method of clause 1, wherein the indication as to whether the positioning capabilities of the UE are stable or are variable identifies whether the positioning capabilities of the UE will be valid over time or may change over time.

Clause 3. The method of clause 1, wherein the positioning capabilities of the UE are stored in the location server.

Clause 4. The method of clause 1, wherein the positioning capabilities of the UE are stored in a second entity in the core network.

Clause 5. The method of clause 4, wherein the location server is a Location Management Function (LMF) and the second entity is an Access and Mobility Management Function (AMF).

Clause 6. The method of any of clauses 1-5, wherein the UE is an Industrial Internet of Things (IIoT) UE with fixed positioning capabilities and the indication indicates that the positioning capabilities of the UE are stable.

Clause 7. The method of any of clauses 1-6, wherein the request for positioning capabilities message is a positioning message for a first location session, wherein the indication indicates that the positioning capabilities of the UE are stable, the method further comprising: receiving positioning messages for a second location session that is subsequent to the first location session, wherein the positioning messages for the second location session do not include a request for positioning capabilities message.

Clause 8. The method of clause 7, wherein the second location session includes the location server.

Clause 9. The method of clause 7, wherein the second location session includes a second location server different to the location server.

Clause 10. A User Equipment (UE) configured for supporting positioning of the UE in a wireless network, comprising: a wireless transceiver configured to wirelessly communicate with entities in the wireless network; at least one memory; at least one processor coupled to the wireless transceiver and the at least one memory, wherein the at least one processor is configured to: receive, via the wireless transceiver, a request for positioning capabilities message from a location server in a core network for the wireless network; and send, via the wireless transceiver, a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

Clause 11. The UE of clause 10, wherein the indication as to whether the positioning capabilities of the UE are stable or are variable identifies whether the positioning capabilities of the UE will be valid over time or may change over time.

Clause 12. The UE of clause 10, wherein the positioning capabilities of the UE are stored in the location server.

Clause 13. The UE of clause 10, wherein the positioning capabilities of the UE are stored in a second entity in the core network.

Clause 14. The UE of clause 13, wherein the location server is a Location Management Function (LMF) and the second entity is an Access and Mobility Management Function (AMF).

Clause 15. The UE of any of clauses 10-14, wherein the UE is an Industrial Internet of Things (IIoT) UE with fixed positioning capabilities and the indication indicates that the positioning capabilities of the UE are stable.

Clause 16. The UE of any of clauses 10-15, wherein the request for positioning capabilities message is a positioning message for a first location session, wherein the indication indicates that the positioning capabilities of the UE are stable, the at least one processor is further configured to: receive positioning messages for a second location session that is subsequent to the first location session, wherein the positioning messages for the second location session do not include a request for positioning capabilities message.

Clause 17. The UE of clause 16, wherein the second location session includes the location server.

Clause 18. The UE of clause 16, wherein the second location session includes a second location server different to the location server.

Clause 19. A User Equipment (UE) configured for supporting positioning of the UE in a wireless network, comprising: means for receiving a request for positioning capabilities message from a location server in a core network for the wireless network; and means for sending a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

Clause 20. The UE of clause 19, wherein the indication as to whether the positioning capabilities of the UE are stable or are variable identifies whether the positioning capabilities of the UE will be valid over time or may change over time.

Clause 21. The UE of clause 19, wherein the positioning capabilities of the UE are stored in the location server.

Clause 22. The UE of clause 19, wherein the positioning capabilities of the UE are stored in a second entity in the core network.

Clause 23. The UE of clause 22, wherein the location server is a Location Management Function (LMF) and the second entity is an Access and Mobility Management Function (AMF).

Clause 24. The UE of any of clauses 19-23, wherein the UE is an Industrial Internet of Things (IIoT) UE with fixed positioning capabilities and the indication indicates that the positioning capabilities of the UE are stable.

Clause 25. The UE of any of clauses 19-24, wherein the request for positioning capabilities message is a positioning message for a first location session, wherein the indication indicates that the positioning capabilities of the UE are stable, further comprising: means for receiving positioning messages for a second location session that is subsequent to the first location session, wherein the positioning messages for the second location session do not include a request for positioning capabilities message.

Clause 26. The UE of clause 25, wherein the second location session includes the location server.

Clause 27. The UE of clause 25, wherein the second location session includes a second location server different to the location server.

Clause 28. A non-transitory storage medium including program code stored thereon, the program code is operable to configure at least one processor in a User Equipment (UE) for supporting positioning of the UE in a wireless network, the program code comprising instructions to: receive a request for positioning capabilities message from a location server in a core network for the wireless network; and send a provide positioning capabilities message to the location server, the provide positioning capabilities message comprising positioning capabilities of the UE and an indication as to whether the positioning capabilities of the UE are stable or are variable, wherein the positioning capabilities of the UE are stored in the core network when the indication indicates that the positioning capabilities of the UE are stable.

Clause 29. The non-transitory storage medium of clause 28, wherein the indication as to whether the positioning capabilities of the UE are stable or are variable identifies whether the positioning capabilities of the UE will be valid over time or may change over time.

Clause 30. The non-transitory storage medium of clause 28, wherein the positioning capabilities of the UE are stored in the location server.

Clause 31. The non-transitory storage medium of clause 28, wherein the positioning capabilities of the UE are stored in a second entity in the core network.

Clause 32. The non-transitory storage medium of clause 31, wherein the location server is a Location Management Function (LMF) and the second entity is an Access and Mobility Management Function (AMF).

Clause 33. The non-transitory storage medium of any of clauses 28-32, wherein the UE is an Industrial Internet of Things (IIoT) UE with fixed positioning capabilities and the indication indicates that the positioning capabilities of the UE are stable.

Clause 34. The non-transitory storage medium of any of clauses 28-33, wherein the request for positioning capabilities message is a positioning message for a first location session, wherein the indication indicates that the positioning capabilities of the UE are stable, the program code further comprising instructions to: receive positioning messages for a second location session that is subsequent to the first location session, wherein the positioning messages for the second location session do not include a request for positioning capabilities message.

Clause 35. The non-transitory storage medium of clause 34, wherein the second location session includes the location server.

Clause 36. The non-transitory storage medium of clause 34, wherein the second location session includes a second location server different to the location server.

Clause 37. A method performed by a location server in a core network for a wireless network for supporting positioning of a User Equipment (UE) in the wireless network, comprising: receiving positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and enabling storage of the positioning capabilities for the UE in the core network if the indication indicates that the positioning capabilities are stable.

Clause 38. The method of clause 37, wherein the indication of whether the positioning capabilities are stable or are variable identifies whether the positioning capabilities will be valid over time or may change over time.

Clause 39. The method of clause 37, further comprising: performing a second location session with the UE that is subsequent to the first location session; and obtaining the positioning capabilities for the UE stored in the core network to enable the performing of the second location session.

Clause 40. The method of clause 39, wherein enabling storage of the positioning capabilities for the UE in the core network comprises storing the positioning capabilities in the location server.

Clause 41. The method of clause 40, further comprising: receiving a first location request for the UE for the first location session from a second entity in the core network, wherein the first location request comprises a UE identification; storing the UE identification in association with the positioning capabilities in the location server; and receiving a second location request for the UE for the second location session from the second entity, wherein the second location request comprises the UE identification, and wherein obtaining the positioning capabilities for the UE stored in the core network is based on the UE identification.

Clause 42. The method of clause 41, wherein the location server is a Location Management Function (LMF) and the second entity is an Access and Mobility Management Function (AMF).

Clause 43. The method of clause 39, wherein enabling storage of the positioning capabilities for the UE in the core network comprises sending the positioning capabilities to a second entity in the core network for storage in the second entity.

Clause 44. The method of clause 43, further comprising sending a location response for the first location session to the second entity, wherein the positioning capabilities are included in the location response.

Clause 45. The method of clause 44, wherein obtaining the positioning capabilities for the UE stored in the core network comprises: receiving a location request for the second location session from the second entity, wherein the location request includes the positioning capabilities for the UE stored in the second entity.

Clause 46. The method of clause 43, wherein the location server is a Location Management Function (LMF) and the second entity is an Access and Mobility Management Function (AMF).

Clause 47. A location server in a core network for a wireless network configured for supporting positioning of a User Equipment (UE) in the wireless network, comprising: an external interface configured to wirelessly communicate with entities in the wireless network; at least one memory; at least one processor coupled to the external interface and the at least one memory, wherein the at least one processor is configured to: receive, via the external interface, positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and enable storage of the positioning capabilities for the UE in the core network if the indication indicates that the positioning capabilities are stable.

Clause 48. The location server of clause 47, wherein the indication of whether the positioning capabilities are stable or are variable identifies whether the positioning capabilities will be valid over time or may change over time.

Clause 49. The location server of clause 47, wherein the at least one processor is further configured to: perform a second location session with the UE that is subsequent to the first location session; and obtain the positioning capabilities for the UE stored in the core network to enable the performing of the second location session.

Clause 50. The location server of clause 49, wherein the at least one processor is configured to enable storage of the positioning capabilities for the UE in the core network by being configured to store the positioning capabilities in the location server.

Clause 51. The location server of clause 50, wherein the at least one processor is further configured to: receive, via the external interface, a first location request for the UE for the first location session from a second entity in the core network, wherein the first location request comprises a UE identification; store the UE identification in association with the positioning capabilities in the location server; and receive, via the external interface, a second location request for the UE for the second location session from the second entity, wherein the second location request comprises the UE identification, and wherein obtaining the positioning capabilities for the UE stored in the core network is based on the UE identification.

Clause 52. The location server of clause 51, wherein the location server is a Location Management Function (LMF) and the second entity is an Access and Mobility Management Function (AMF).

Clause 53. The location server of clause 49, wherein the at least one processor is configured to enable storage of the positioning capabilities for the UE in the core network by being configured to send, via the external interface, the positioning capabilities to a second entity in the core network for storage in the second entity.

Clause 54. The location server of clause 53, wherein the at least one processor is configured to send, via the external interface, a location response for the first location session to the second entity, wherein the positioning capabilities are included in the location response.

Clause 55. The location server of clause 54, wherein the at least one processor is configured to obtain the positioning capabilities for the UE stored in the core network by being configured to: receive, via the external interface, a location request for the second location session from the second entity, wherein the location request includes the positioning capabilities for the UE stored in the second entity.

Clause 56. The location server of clause 53, wherein the location server is a Location Management Function (LMF) and the second entity is an Access and Mobility Management Function (AMF).

Clause 57. A location server in a core network for a wireless network configured for supporting positioning of a User Equipment (UE) in the wireless network, comprising: means for receiving positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and means for enabling storage of the positioning capabilities for the UE in the core network if the indication indicates that the positioning capabilities are stable.

Clause 58. The location server of clause 57, wherein the indication of whether the positioning capabilities are stable or are variable identifies whether the positioning capabilities will be valid over time or may change over time.

Clause 59. The location server of clause 57, further comprising: means for performing a second location session with the UE that is subsequent to the first location session; and means for obtaining the positioning capabilities for the UE stored in the core network to enable the performing of the second location session.

Clause 60. The location server of clause 59, wherein the means for enabling storage of the positioning capabilities for the UE in the core network stores the positioning capabilities in the location server.

Clause 61. The location server of clause 60, further comprising: means for receiving a first location request for the UE for the first location session from a second entity in the core network, wherein the first location request comprises a UE identification; means for storing the UE identification in association with the positioning capabilities in the location server; and means for receiving a second location request for the UE for the second location session from the second entity, wherein the second location request comprises the UE identification, and wherein the means for obtaining the positioning capabilities for the UE stored in the core network uses the UE identification.

Clause 62. The location server of clause 61, wherein the location server is a Location Management Function (LMF) and the second entity is an Access and Mobility Management Function (AMF).

Clause 63. The location server of clause 59, wherein the means for enabling storage of the positioning capabilities for the UE in the core network sends the positioning capabilities to a second entity in the core network for storage in the second entity.

Clause 64. The location server of clause 63, further comprising means for sending a location response for the first location session to the second entity, wherein the positioning capabilities are included in the location response.

Clause 65. The location server of clause 64, wherein the means for obtaining the positioning capabilities for the UE stored in the core network comprises: means for receiving a location request for the second location session from the second entity, wherein the location request includes the positioning capabilities for the UE stored in the second entity.

Clause 66. The location server of clause 63, wherein the location server is a Location Management Function (LMF) and the second entity is an Access and Mobility Management Function (AMF).

Clause 67. A non-transitory storage medium including program code stored thereon, the program code is operable to configure at least one processor in a location server in a core network for a wireless network for supporting positioning of a User Equipment (UE) in the wireless network, the program code comprising instructions to: receive positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and enable storage of the positioning capabilities for the UE in the core network if the indication indicates that the positioning capabilities are stable.

Clause 68. The non-transitory storage medium of clause 67, wherein the indication of whether the positioning capabilities are stable or are variable identifies whether the positioning capabilities will be valid over time or may change over time.

Clause 69. The non-transitory storage medium of clause 67, wherein the program code further comprises instructions to: perform a second location session with the UE that is subsequent to the first location session; and obtain the positioning capabilities for the UE stored in the core network to enable the performing of the second location session.

Clause 70. The non-transitory storage medium of clause 69, wherein the instructions to enable storage of the positioning capabilities for the UE in the core network comprise instructions to store the positioning capabilities in the location server.

Clause 71. The non-transitory storage medium of clause 70, wherein the program code further comprises instructions to: receive a first location request for the UE for the first location session from a second entity in the core network, wherein the first location request comprises a UE identification; store the UE identification in association with the positioning capabilities in the location server; and receive a second location request for the UE for the second location session from the second entity, wherein the second location request comprises the UE identification, and wherein the instructions to obtain the positioning capabilities for the UE stored in the core network uses the UE identification.

Clause 72. The non-transitory storage medium of clause 71, wherein the location server is a Location Management Function (LMF) and the second entity is an Access and Mobility Management Function (AMF).

Clause 73. The non-transitory storage medium of clause 69, wherein the instructions to enable storage of the positioning capabilities for the UE in the core network comprise instructions to send the positioning capabilities to a second entity in the core network for storage in the second entity.

Clause 74. The non-transitory storage medium of clause 73, wherein the program code comprises instructions to send a location response for the first location session to the second entity, wherein the positioning capabilities are included in the location response.

Clause 75. The non-transitory storage medium of clause 74, wherein the instructions to obtain the positioning capabilities for the UE stored in the core network comprise instructions to: receive a location request for the second location session from the second entity, wherein the location request includes the positioning capabilities for the UE stored in the second entity.

Clause 76. The non-transitory storage medium of clause 73, wherein the location server is a Location Management Function (LMF) and the second entity is an Access and Mobility Management Function (AMF).

Clause 77. A method performed by a first entity in a core network for a wireless network for supporting positioning of a User Equipment (UE) in the wireless network, comprising: storing positioning capabilities for the UE when the UE indicates that the positioning capabilities are stable; and sending a location request to a location server wherein the location request includes the stored positioning capabilities for the UE.

Clause 78. The method of clause 77, further comprising receiving a Non-Access Stratum (NAS) message from the UE, the NAS message including the positioning capabilities for the UE and an indication of whether the positioning capabilities are stable or are variable.

Clause 79. The method of clause 78, wherein the positioning capabilities in the NAS message are included in a Long Term Evolution (LTE) Positioning Protocol (LPP) Provide Capabilities message included as a parameter in the NAS message.

Clause 80. The method of clause 77, further comprising receiving the positioning capabilities for the UE for storage from a second entity in the core network in response to the second entity receiving from the UE the positioning capabilities for the UE and an indication that the positioning capabilities are stable.

Clause 81. The method of clause 80, wherein the positioning capabilities are received in a location response sent by the second entity for a first location session, and wherein the location request sent to the location server is for a second location session that is subsequent to the first location session.

Clause 82. The method of clause 81, wherein the second entity is the location server.

Clause 83. The method of clause 81, wherein the second entity is a second location server that is different than the location server.

Clause 84. The method of any of clauses 77-83, wherein the first entity is an Access and Mobility Management Function (AMF) and the location server is a Location Management Function (LMF).

Clause 85. A first entity in a core network for a wireless network configured for supporting positioning of a User Equipment (UE) in the wireless network, comprising: an external interface configured to wirelessly communicate with entities in the wireless network; at least one memory; at least one processor coupled to the external interface and the at least one memory, wherein the at least one processor is configured to: store positioning capabilities for the UE when the UE indicates that the positioning capabilities are stable; and send, via the external interface, a location request to a location server wherein the location request includes the stored positioning capabilities for the UE.

Clause 86. The first entity of clause 85, wherein the at least one processor is further configured to receive, via the external interface, a Non-Access Stratum (NAS) message from the UE, the NAS message including the positioning capabilities for the UE and an indication of whether the positioning capabilities are stable or are variable.

Clause 87. The first entity of clause 86, wherein the positioning capabilities in the NAS message are included in a Long Term Evolution (LTE) Positioning Protocol (LPP) Provide Capabilities message included as a parameter in the NAS message.

Clause 88. The first entity of clause 85, wherein the at least one processor is configured to receive, via the external interface, the positioning capabilities for the UE for storage from a second entity in the core network in response to the second entity receiving from the UE the positioning capabilities for the UE and an indication that the positioning capabilities are stable.

Clause 89. The first entity of clause 88, wherein the positioning capabilities are received in a location response sent by the second entity for a first location session, and wherein the location request sent to the location server is for a second location session that is subsequent to the first location session.

Clause 90. The first entity of clause 89, wherein the second entity is the location server.

Clause 91. The first entity of clause 89, wherein the second entity is a second location server that is different than the location server.

Clause 92. The first entity of any of clauses 85-91, wherein the first entity is an Access and Mobility Management Function (AMF) and the location server is a Location Management Function (LMF).

Clause 93. A first entity in a core network for a wireless network configured for supporting positioning of a User Equipment (UE) in the wireless network, comprising: means for storing positioning capabilities for the UE when the UE indicates that the positioning capabilities are stable; and means for sending a location request to a location server wherein the location request includes the stored positioning capabilities for the UE.

Clause 94. The first entity of clause 93, further comprising means for receiving a Non-Access Stratum (NAS) message from the UE, the NAS message including the positioning capabilities for the UE and an indication of whether the positioning capabilities are stable or are variable.

Clause 95. The first entity of clause 94, wherein the positioning capabilities in the NAS message are included in a Long Term Evolution (LTE) Positioning Protocol (LPP) Provide Capabilities message included as a parameter in the NAS message.

Clause 96. The first entity of clause 93, further comprising means for receiving the positioning capabilities for the UE for storage from a second entity in the core network in response to the second entity receiving from the UE the positioning capabilities for the UE and an indication that the positioning capabilities are stable.

Clause 97. The first entity of clause 96, wherein the positioning capabilities are received in a location response sent by the second entity for a first location session, and wherein the location request sent to the location server is for a second location session that is subsequent to the first location session.

Clause 98. The first entity of clause 97, wherein the second entity is the location server.

Clause 99. The first entity of clause 97, wherein the second entity is a second location server that is different than the location server.

Clause 100. The first entity of any of clauses 93-99, wherein the first entity is an Access and Mobility Management Function (AMF) and the location server is a Location Management Function (LMF).

Clause 101. A non-transitory storage medium including program code stored thereon, the program code is operable to configure at least one processor in a first entity in a core network for a wireless network for supporting positioning of a User Equipment (UE) in the wireless network, the program code comprising instructions to: store positioning capabilities for the UE when the UE indicates that the positioning capabilities are stable; and send a location request to a location server wherein the location request includes the stored positioning capabilities for the UE.

Clause 102. The non-transitory storage medium of clause 101, wherein the program code further comprises instructions to receive a Non-Access Stratum (NAS) message from the UE, the NAS message including the positioning capabilities for the UE and an indication of whether the positioning capabilities are stable or are variable.

Clause 103. The non-transitory storage medium of clause 102, wherein the positioning capabilities in the NAS message are included in a Long Term Evolution (LTE) Positioning Protocol (LPP) Provide Capabilities message included as a parameter in the NAS message.

Clause 104. The non-transitory storage medium of clause 101, wherein the program code comprises instructions to receive the positioning capabilities for the UE for storage from a second entity in the core network in response to the second entity receiving from the UE the positioning capabilities for the UE and an indication that the positioning capabilities are stable.

Clause 105. The non-transitory storage medium of clause 104, wherein the positioning capabilities are received in a location response sent by the second entity for a first location session, and wherein the location request sent to the location server is for a second location session that is subsequent to the first location session.

Clause 106. The non-transitory storage medium of clause 105, wherein the second entity is the location server.

Clause 107. The non-transitory storage medium of clause 105, wherein the second entity is a second location server that is different than the location server.

Clause 108. The non-transitory storage medium of any of clauses 101-107, wherein the first entity is an Access and Mobility Management Function (AMF) and the location server is a Location Management Function (LMF).

Clause 109. A method performed by a first entity in a core network for a wireless network for supporting positioning of a User Equipment (UE) in the wireless network, comprising: receiving a location request for the UE; sending a location request message to a location server, wherein the location request message comprises an identification for the UE, wherein positioning capabilities for the UE and the identification for the UE are stored by the location server when there is an indication from the UE that the positioning capabilities for the UE are stable.

Clause 110. The method of clause 109, wherein the identification for the UE is a Subscription Permanent Identifier (SUPI) or a Permanent Equipment Identifier (PEI) for the UE.

Clause 111. The method of clause 109, wherein the identification for the UE is an identifier generated by the first entity.

Clause 112. The method of any of clauses 109-111, wherein the first entity is an Access and Mobility Management Function (AMF) and the location server is a Location Management Function (LMF).

Clause 113. A first entity in a core network for a wireless network configured for supporting positioning of a User Equipment (UE) in the wireless network, comprising: an external interface configured to wirelessly communicate with entities in the wireless network; at least one memory; at least one processor coupled to the external interface and the at least one memory, wherein the at least one processor is configured to: receive, via the external interface, a location request for the UE; send, via the external interface, a location request message to a location server, wherein the location request message comprises an identification for the UE, wherein positioning capabilities for the UE and the identification for the UE are stored by the location server when there is an indication from the UE that the positioning capabilities for the UE are stable.

Clause 114. The first entity of clause 113, wherein the identification for the UE is a Subscription Permanent Identifier (SUPI) or a Permanent Equipment Identifier (PEI) for the UE.

Clause 115. The first entity of clause 113, wherein the identification for the UE is an identifier generated by the first entity.

Clause 116. The first entity of any of clauses 113-115, wherein the first entity is an Access and Mobility Management Function (AMF) and the location server is a Location Management Function (LMF).

Clause 117. A first entity in a core network for a wireless network configured for supporting positioning of a User Equipment (UE) in the wireless network, comprising: means for receiving a location request for the UE; means for sending a location request message to a location server, wherein the location request message comprises an identification for the UE, wherein positioning capabilities for the UE and the identification for the UE are stored by the location server when there is an indication from the UE that the positioning capabilities for the UE are stable.

Clause 118. The first entity of clause 117, wherein the identification for the UE is a Subscription Permanent Identifier (SUPI) or a Permanent Equipment Identifier (PEI) for the UE.

Clause 119. The first entity of clause 117, wherein the identification for the UE is an identifier generated by the first entity.

Clause 120. The first entity of any of clauses 117-119, wherein the first entity is an Access and Mobility Management Function (AMF) and the location server is a Location Management Function (LMF).

Clause 121. A non-transitory storage medium including program code stored thereon, the program code is operable to configure at least one processor in a first entity in a core network for a wireless network for supporting positioning of a User Equipment (UE) in the wireless network, the program code comprising instructions to: receive a location request for the UE; send a location request message to a location server, wherein the location request message comprises an identification for the UE, wherein positioning capabilities for the UE and the identification for the UE are stored by the location server when there is an indication from the UE that the positioning capabilities for the UE are stable.

Clause 122. The non-transitory storage medium of clause 121, wherein the identification for the UE is a Subscription Permanent Identifier (SUPI) or a Permanent Equipment Identifier (PEI) for the UE.

Clause 123. The non-transitory storage medium of clause 121, wherein the identification for the UE is an identifier generated by the first entity.

Clause 124. The non-transitory storage medium of any of clauses 121-123, wherein the first entity is an Access and Mobility Management Function (AMF) and the location server is a Location Management Function (LMF).

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

The invention claimed is:

1. A method performed by a location server in a core network for a wireless network for supporting positioning of a User Equipment (UE) in the wireless network, comprising:
receiving positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and
enabling storage of the positioning capabilities for the UE in the core network if the indication indicates that the positioning capabilities are stable.

2. The method of claim 1, wherein the indication of whether the positioning capabilities are stable or are variable identifies whether the positioning capabilities will be valid over time or may change over time.

3. The method of claim 1, further comprising:
performing a second location session with the UE that is subsequent to the first location session; and
obtaining the positioning capabilities for the UE stored in the core network to enable the performing of the second location session.

4. The method of claim 3, wherein enabling storage of the positioning capabilities for the UE in the core network comprises storing the positioning capabilities in the location server.

5. The method of claim 4, further comprising:
receiving a first location request for the UE for the first location session from a second entity in the core network, wherein the first location request comprises a UE identification;
storing the UE identification in association with the positioning capabilities in the location server; and
receiving a second location request for the UE for the second location session from the second entity, wherein the second location request comprises the UE identification, and wherein obtaining the positioning capabilities for the UE stored in the core network is based on the UE identification.

6. The method of claim 5, wherein the location server is a Location Management Function (LMF) and the second entity is an Access and Mobility Management Function (AMF).

7. The method of claim 3, wherein enabling storage of the positioning capabilities for the UE in the core network comprises sending the positioning capabilities to a second entity in the core network for storage in the second entity.

8. The method of claim 7, further comprising sending a location response for the first location session to the second entity, wherein the positioning capabilities are included in the location response.

9. The method of claim 8, wherein obtaining the positioning capabilities for the UE stored in the core network comprises:

receiving a location request for the second location session from the second entity, wherein the location request includes the positioning capabilities for the UE stored in the second entity.

10. The method of claim 7, wherein the location server is a Location Management Function (LMF) and the second entity is an Access and Mobility Management Function (AMF).

11. A location server in a core network for a wireless network configured for supporting positioning of a User Equipment (UE) in the wireless network, comprising:
an external interface configured to wirelessly communicate with entities in the wireless network;
at least one memory;
at least one processor coupled to the external interface and the at least one memory, wherein the at least one processor is configured to:
receive, via the external interface, positioning capabilities for the UE in a first location session, the positioning capabilities for the UE received from the UE in response to a request for positioning capabilities sent to the UE or received unsolicited from the UE, the positioning capabilities including an indication of whether the positioning capabilities are stable or are variable; and
enable storage of the positioning capabilities for the UE in the core network if the indication indicates that the positioning capabilities are stable.

12. The location server of claim 11, wherein the indication of whether the positioning capabilities are stable or are variable identifies whether the positioning capabilities will be valid over time or may change over time.

13. The location server of claim 11, wherein the at least one processor is further configured to:
perform a second location session with the UE that is subsequent to the first location session; and
obtain the positioning capabilities for the UE stored in the core network to enable the performing of the second location session.

14. The location server of claim 13, wherein the at least one processor is configured to enable storage of the positioning capabilities for the UE in the core network by being configured to store the positioning capabilities in the location server.

15. The location server of claim 14, wherein the at least one processor is further configured to:
receive, via the external interface, a first location request for the UE for the first location session from a second entity in the core network, wherein the first location request comprises a UE identification;
store the UE identification in association with the positioning capabilities in the location server; and
receive, via the external interface, a second location request for the UE for the second location session from the second entity, wherein the second location request comprises the UE identification, and wherein obtaining the positioning capabilities for the UE stored in the core network is based on the UE identification.

16. The location server of claim 15, wherein the location server is a Location Management Function (LMF) and the second entity is an Access and Mobility Management Function (AMF).

17. The location server of claim 13, wherein the at least one processor is configured to enable storage of the positioning capabilities for the UE in the core network by being configured to send, via the external interface, the positioning capabilities to a second entity in the core network for storage in the second entity.

18. The location server of claim 17, wherein the at least one processor is configured to send, via the external interface, a location response for the first location session to the second entity, wherein the positioning capabilities are included in the location response.

19. The location server of claim 18, wherein the at least one processor is configured to obtain the positioning capabilities for the UE stored in the core network by being configured to:
receive, via the external interface, a location request for the second location session from the second entity, wherein the location request includes the positioning capabilities for the UE stored in the second entity.

20. The location server of claim 17, wherein the location server is a Location Management Function (LMF) and the second entity is an Access and Mobility Management Function (AMF).

21. A method performed by a first entity in a core network for a wireless network for supporting positioning of a User Equipment (UE) in the wireless network, comprising:
storing positioning capabilities for the UE when the UE indicates that the positioning capabilities are stable; and
sending a location request to a location server wherein the location request includes the stored positioning capabilities for the UE.

22. The method of claim 21, further comprising receiving a Non-Access Stratum (NAS) message from the UE, the NAS message including the positioning capabilities for the UE and an indication of whether the positioning capabilities are stable or are variable.

23. The method of claim 22, wherein the positioning capabilities in the NAS message are included in a Long Term Evolution (LTE) Positioning Protocol (LPP) Provide Capabilities message included as a parameter in the NAS message.

24. The method of claim 21, further comprising receiving the positioning capabilities for the UE for storage from a second entity in the core network in response to the second entity receiving from the UE the positioning capabilities for the UE and an indication that the positioning capabilities are stable.

25. The method of claim 24, wherein the positioning capabilities are received in a location response sent by the second entity for a first location session, and wherein the location request sent to the location server is for a second location session that is subsequent to the first location session.

26. The method of claim 25, wherein the second entity is the location server.

27. The method of claim 25, wherein the second entity is a second location server that is different than the location server.

28. The method of claim 21, wherein the first entity is an Access and Mobility Management Function (AMF) and the location server is a Location Management Function (LMF).

29. A first entity in a core network for a wireless network configured for supporting positioning of a User Equipment (UE) in the wireless network, comprising:
an external interface configured to wirelessly communicate with entities in the wireless network;
at least one memory;
at least one processor coupled to the external interface and the at least one memory, wherein the at least one processor is configured to:

store positioning capabilities for the UE when the UE indicates that the positioning capabilities are stable; and send, via the external interface, a location request to a location server wherein the location request includes the stored positioning capabilities for the UE.

30. The first entity of claim 29, wherein the at least one processor is further configured to receive, via the external interface, a Non-Access Stratum (NAS) message from the UE, the NAS message including the positioning capabilities for the UE and an indication of whether the positioning capabilities are stable or are variable.

31. The first entity of claim 30, wherein the positioning capabilities in the NAS message are included in a Long Term Evolution (LTE) Positioning Protocol (LPP) Provide Capabilities message included as a parameter in the NAS message.

32. The first entity of claim 29, wherein the at least one processor is configured to receive, via the external interface, the positioning capabilities for the UE for storage from a second entity in the core network in response to the second entity receiving from the UE the positioning capabilities for the UE and an indication that the positioning capabilities are stable.

33. The first entity of claim 32, wherein the positioning capabilities are received in a location response sent by the second entity for a first location session, and wherein the location request sent to the location server is for a second location session that is subsequent to the first location session.

34. The first entity of claim 33, wherein the second entity is the location server.

35. The first entity of claim 33, wherein the second entity is a second location server that is different than the location server.

36. The first entity of claim 29, wherein the first entity is an Access and Mobility Management Function (AMF) and the location server is a Location Management Function (LMF).

37. A method performed by a first entity in a core network for a wireless network for supporting positioning of a User Equipment (UE) in the wireless network, comprising:

receiving a location request for the UE;

sending a location request message to a location server, wherein the location request message comprises an identification for the UE, wherein positioning capabilities for the UE and the identification for the UE are stored by the location server when there is an indication from the UE that the positioning capabilities for the UE are stable.

38. The method of claim 37, wherein the identification for the UE is a Subscription Permanent Identifier (SUPI) or a Permanent Equipment Identifier (PEI) for the UE.

39. The method of claim 37, wherein the identification for the UE is an identifier generated by the first entity.

40. The method of claim 37, wherein the first entity is an Access and Mobility Management Function (AMF) and the location server is a Location Management Function (LMF).

41. A first entity in a core network for a wireless network configured for supporting positioning of a User Equipment (UE) in the wireless network, comprising:

an external interface configured to wirelessly communicate with entities in the wireless network;

at least one memory;

at least one processor coupled to the external interface and the at least one memory, wherein the at least one processor is configured to:

receive, via the external interface, a location request for the UE;

send, via the external interface, a location request message to a location server, wherein the location request message comprises an identification for the UE, wherein positioning capabilities for the UE and the identification for the UE are stored by the location server when there is an indication from the UE that the positioning capabilities for the UE are stable.

42. The first entity of claim 41, wherein the identification for the UE is a Subscription Permanent Identifier (SUPI) or a Permanent Equipment Identifier (PEI) for the UE.

43. The first entity of claim 41, wherein the identification for the UE is an identifier generated by the first entity.

44. The first entity of claim 41, wherein the first entity is an Access and Mobility Management Function (AMF) and the location server is a Location Management Function (LMF).

* * * * *